Figure 2G:
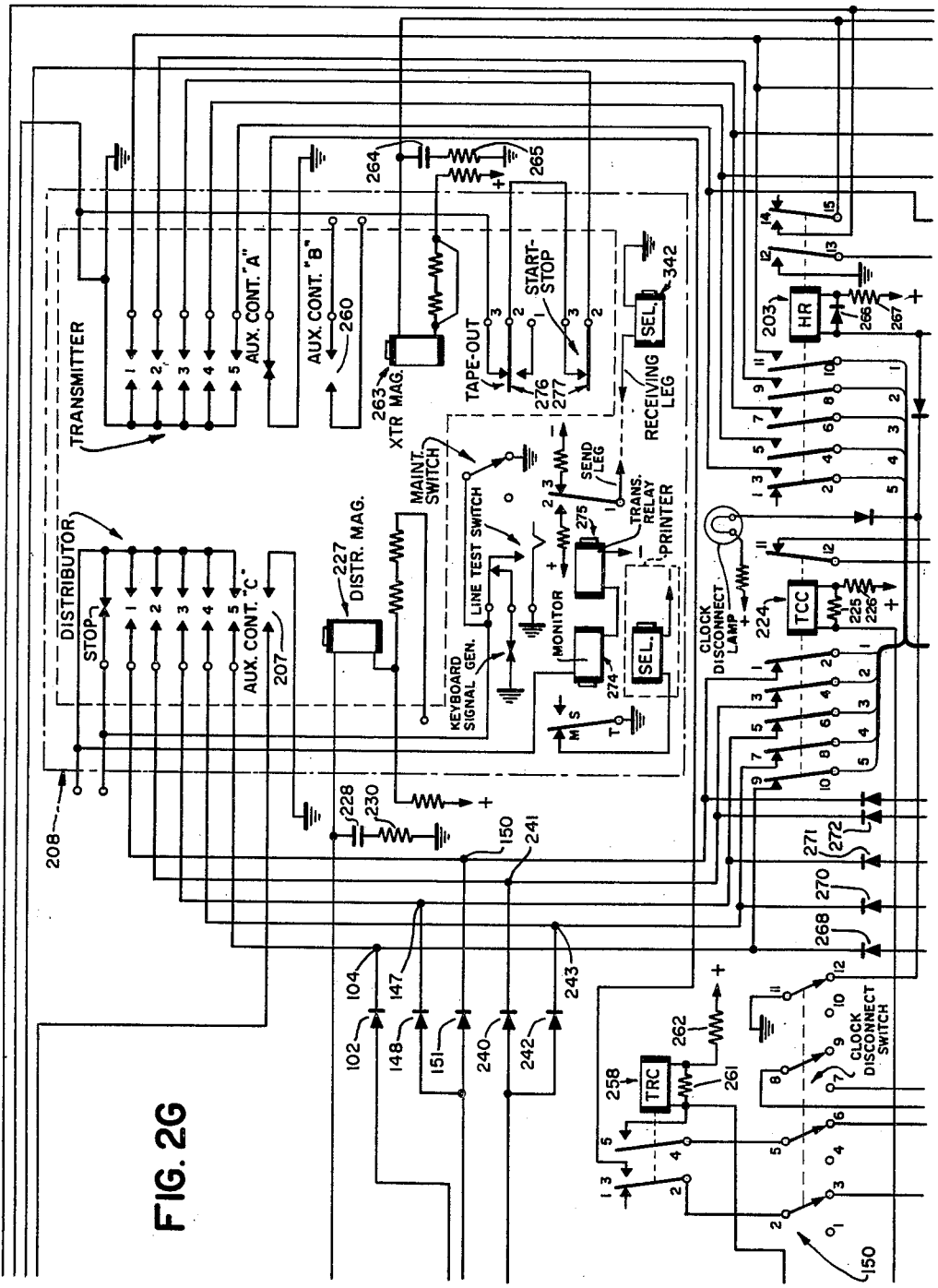

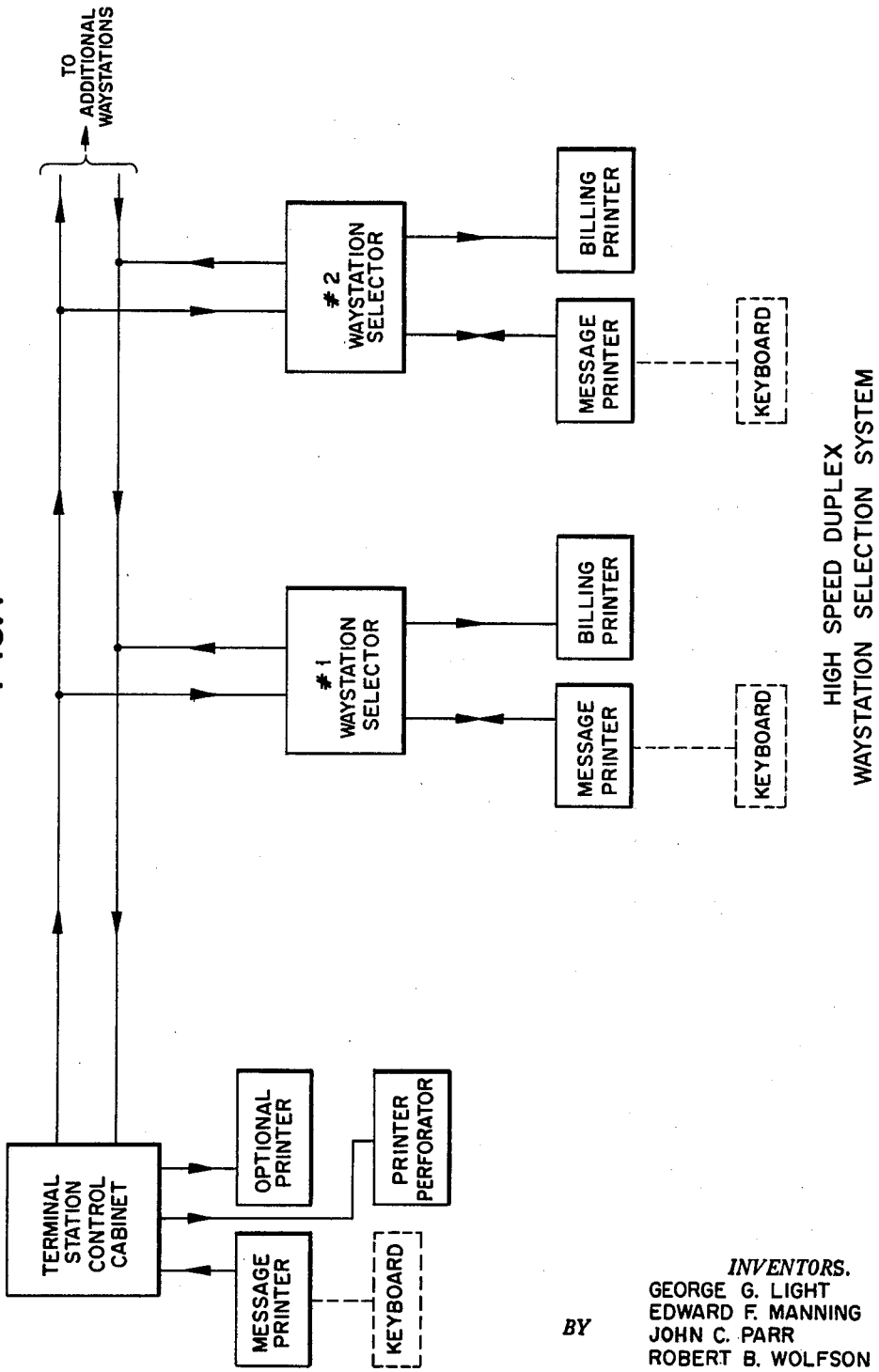

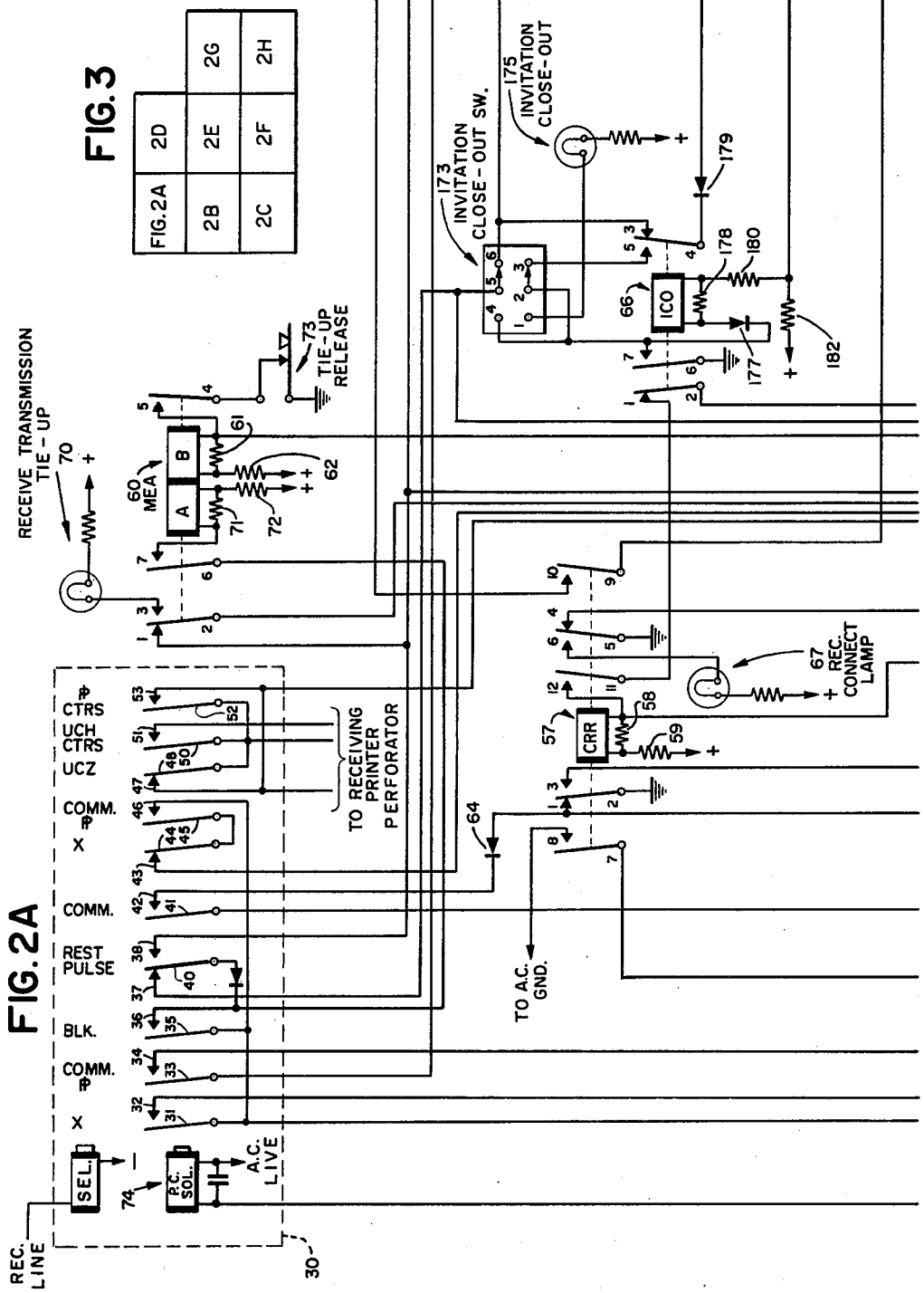

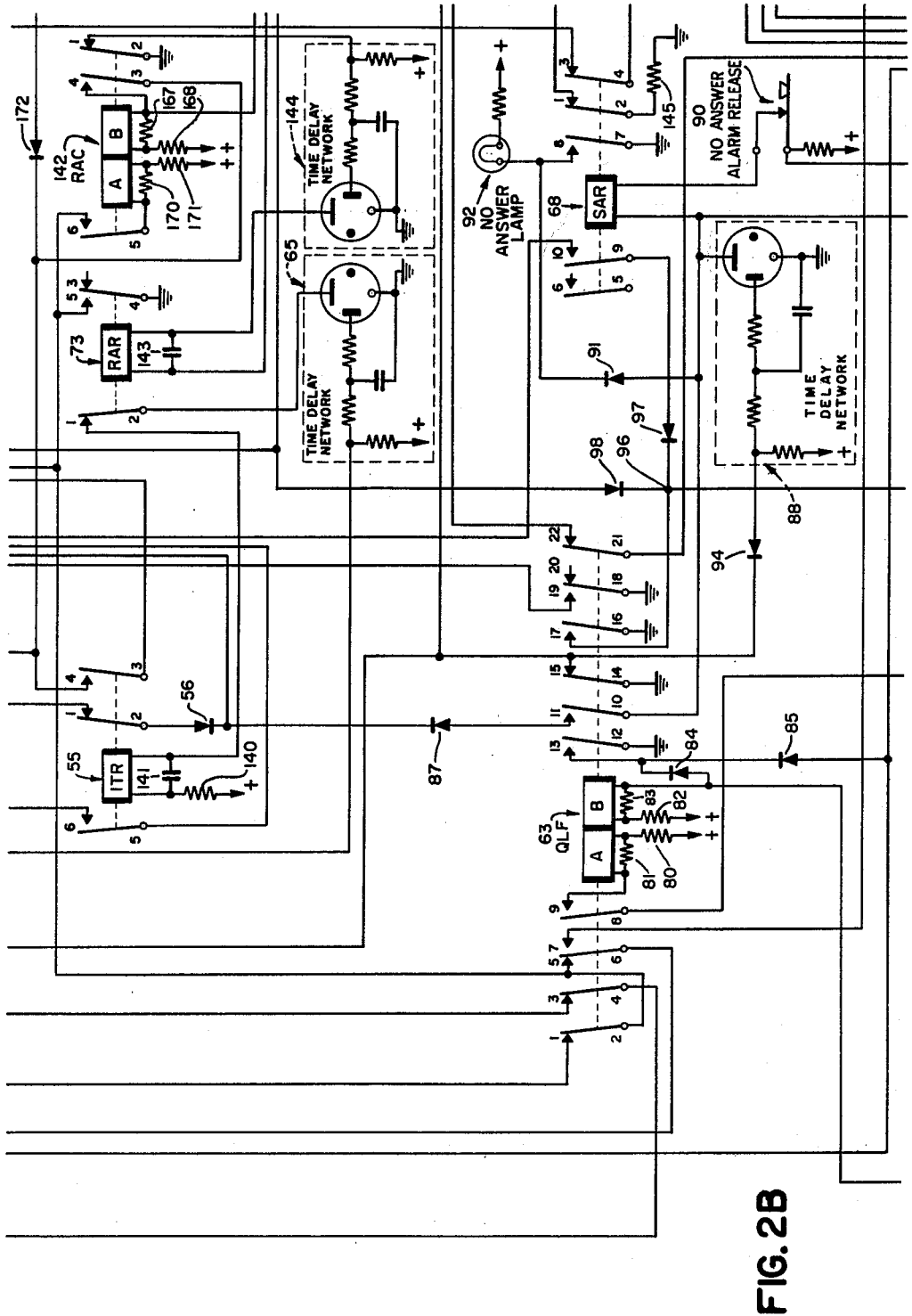

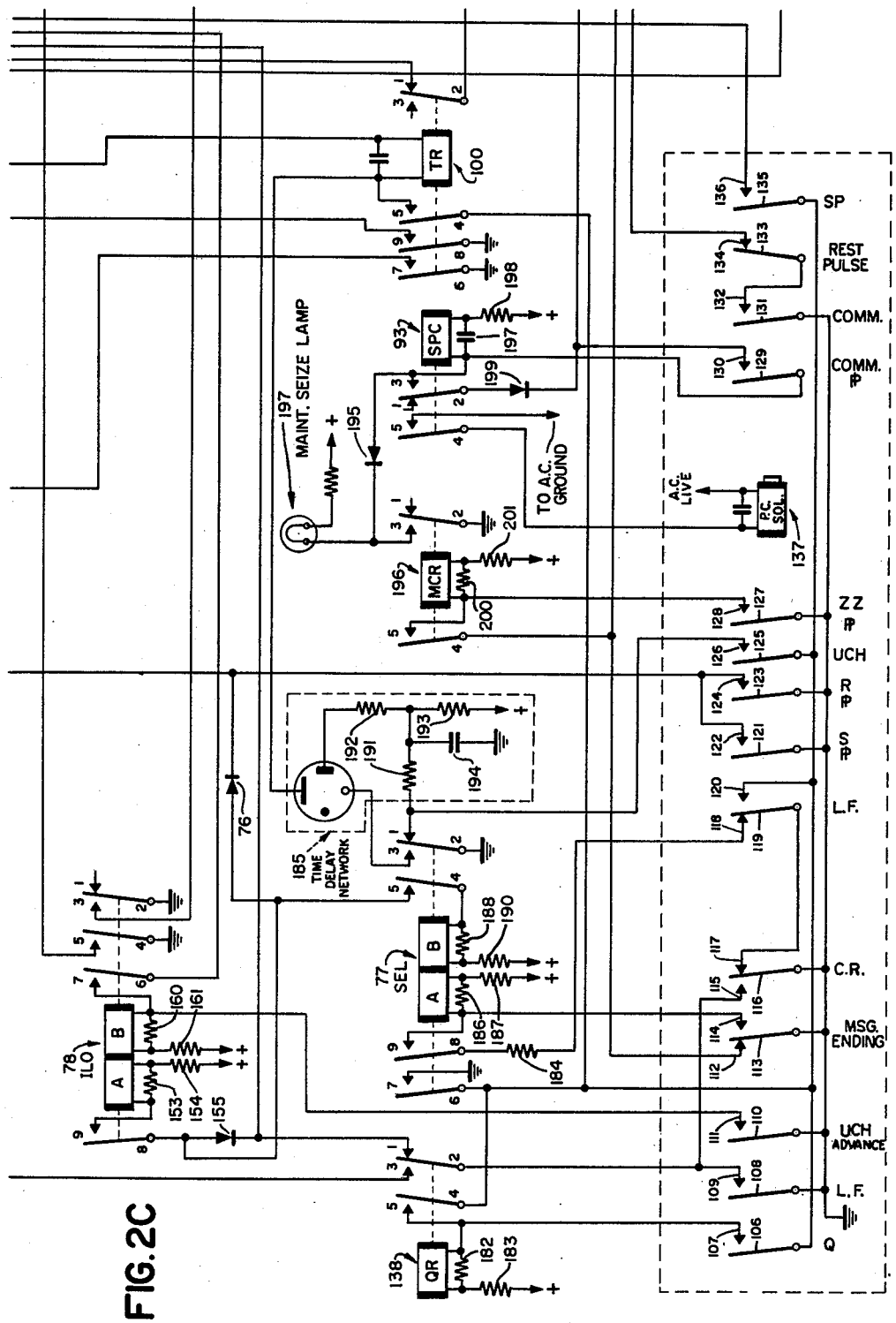

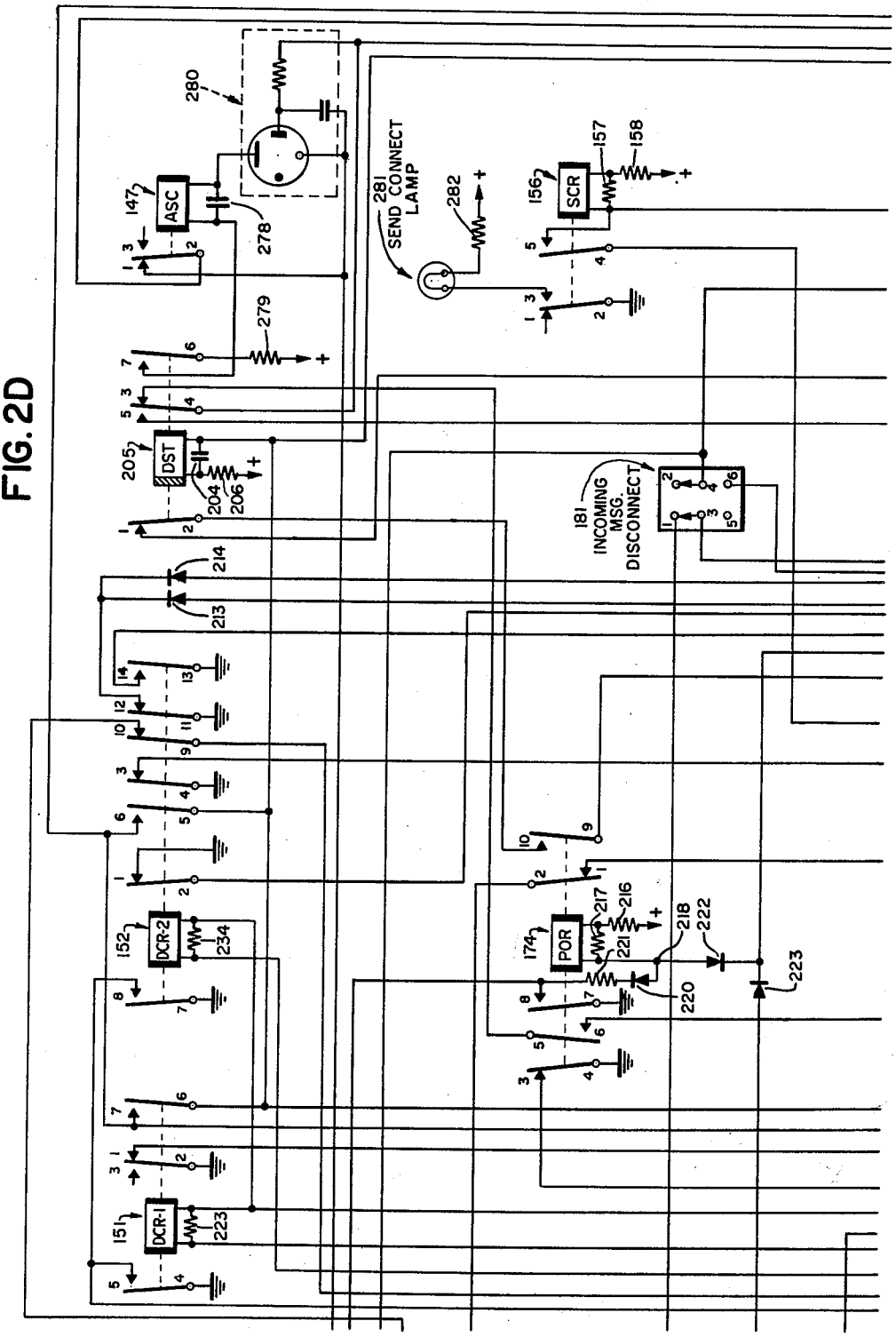

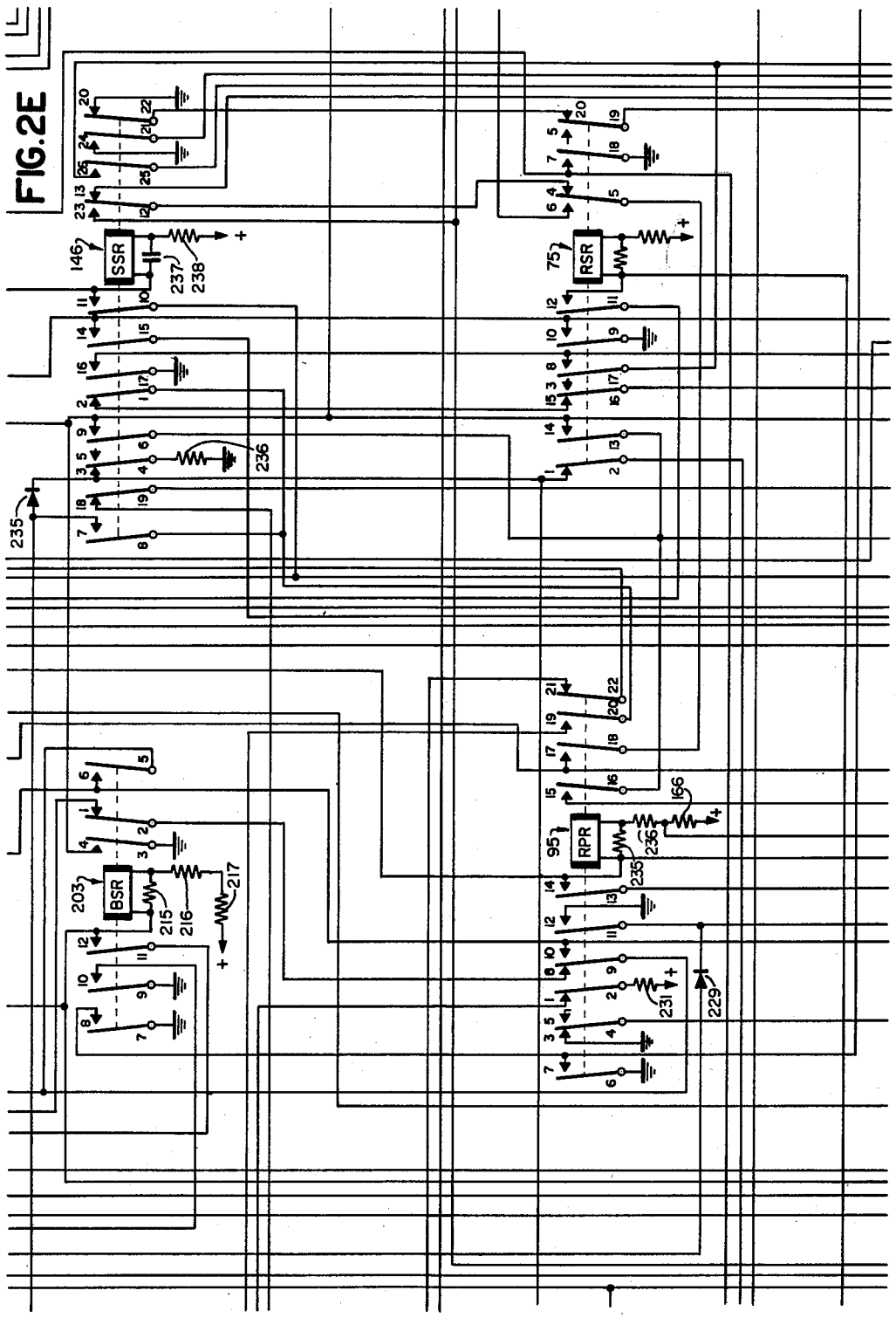

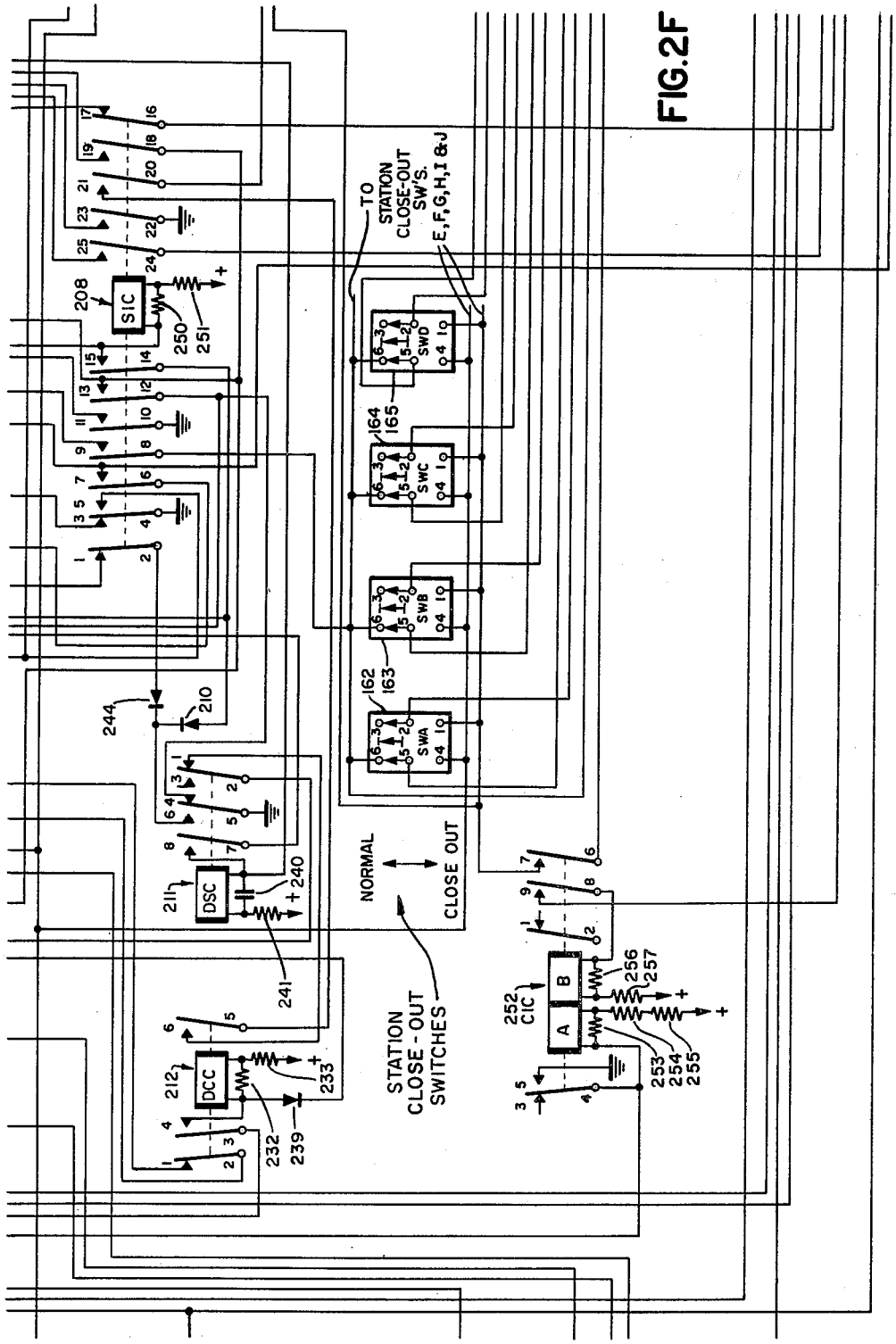

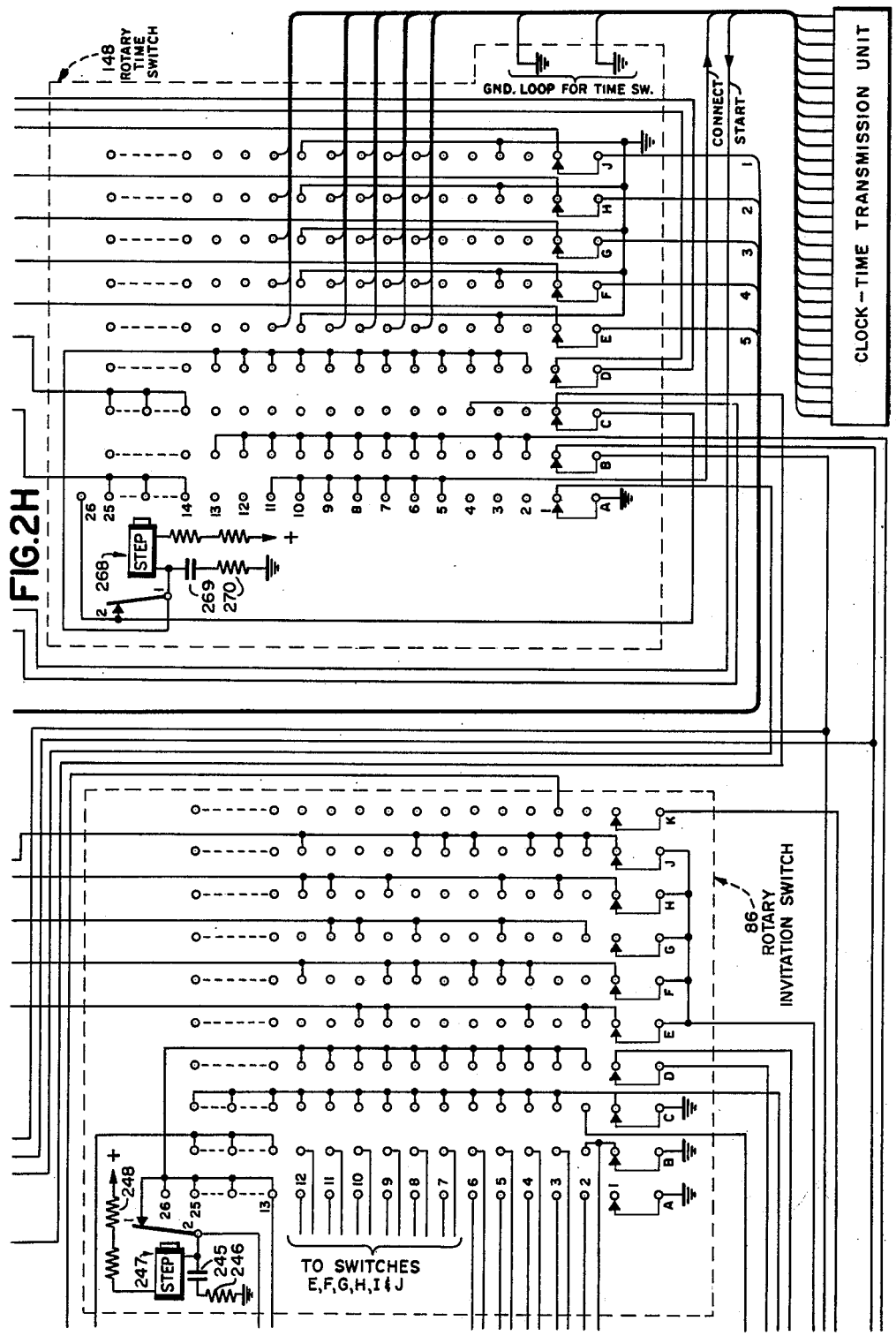

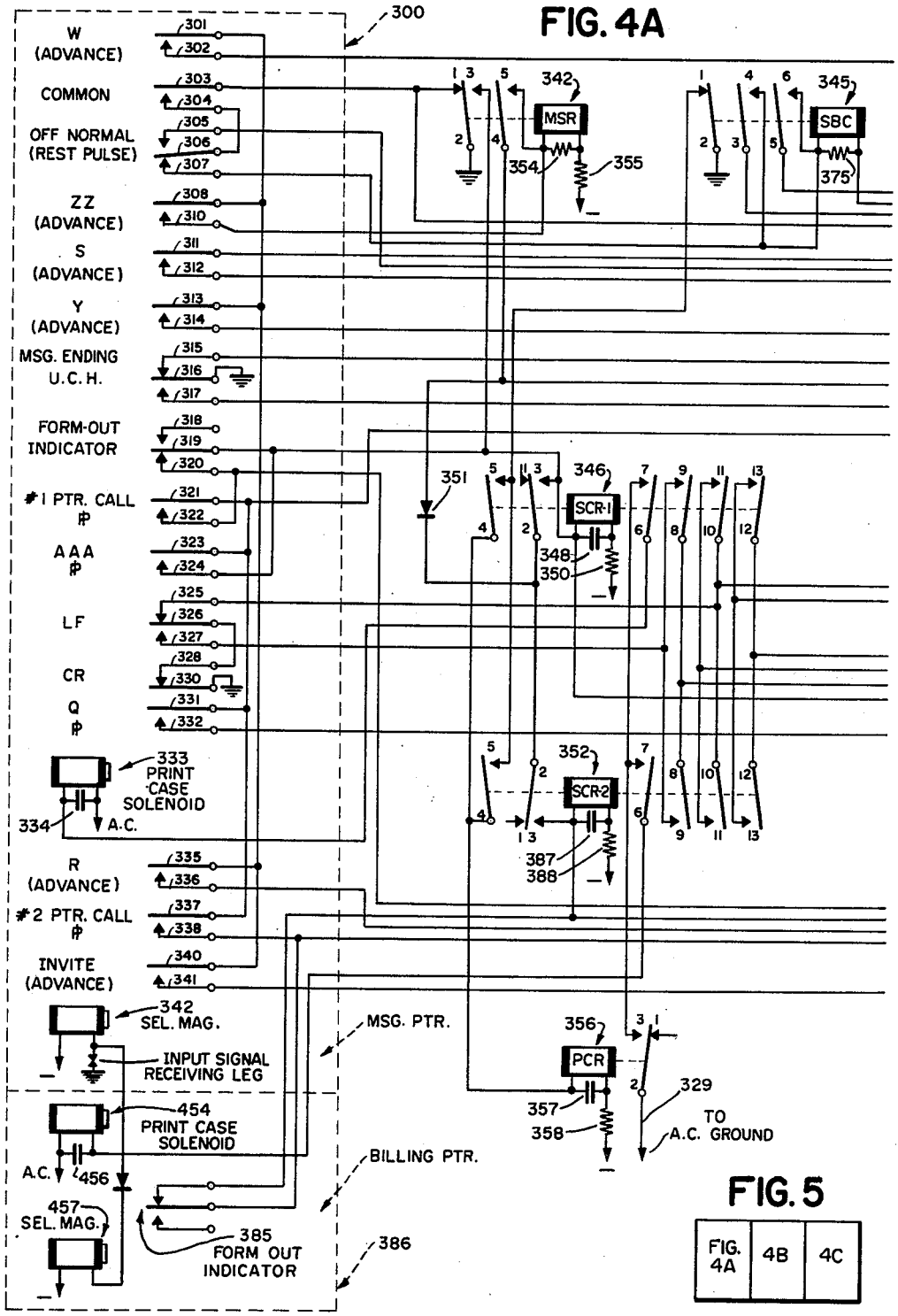

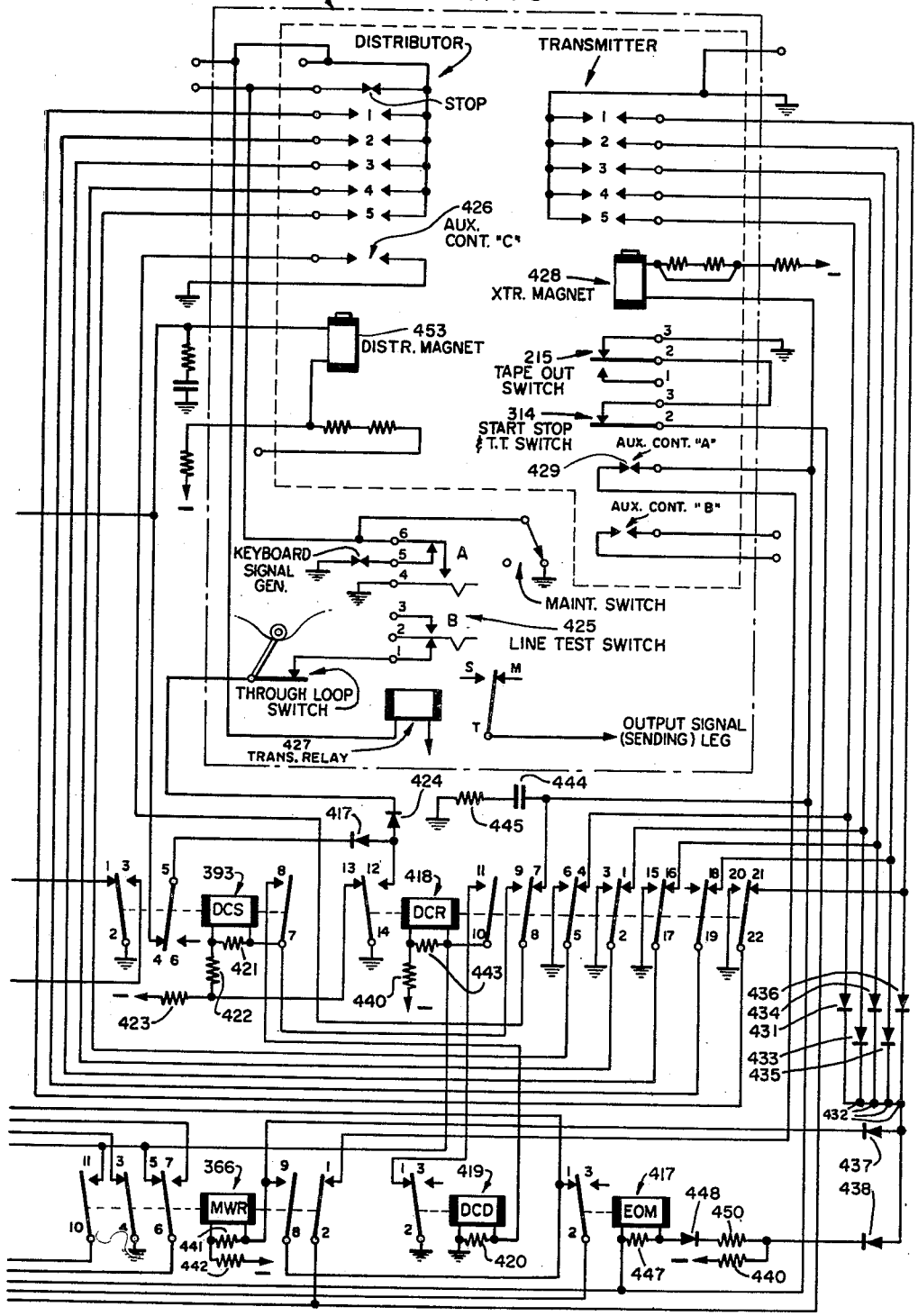

May 26, 1964     G. G. LIGHT ETAL     3,134,848

WAYSTATION SELECTION NETWORK

Filed March 14, 1961     13 Sheets-Sheet 13

FIG. 6

1. A) TERMINAL STATION MESSAGE TAPE FORMAT SENDING TO SINGLE WAYSTATION WITH SELECTION ANSWER BACK REQUIRED

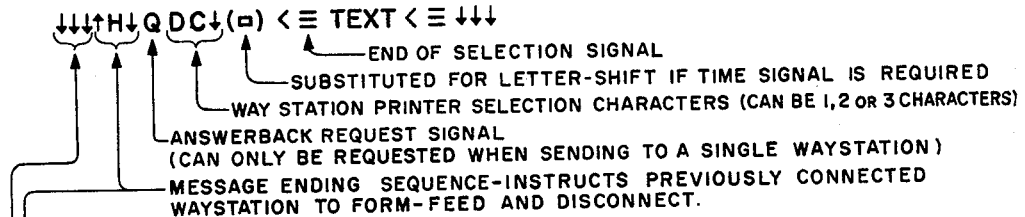

- END OF SELECTION SIGNAL
- SUBSTITUTED FOR LETTER-SHIFT IF TIME SIGNAL IS REQUIRED
- WAY STATION PRINTER SELECTION CHARACTERS (CAN BE 1, 2 OR 3 CHARACTERS)
- ANSWERBACK REQUEST SIGNAL (CAN ONLY BE REQUESTED WHEN SENDING TO A SINGLE WAYSTATION)
- MESSAGE ENDING SEQUENCE-INSTRUCTS PREVIOUSLY CONNECTED WAYSTATION TO FORM-FEED AND DISCONNECT.

B) MESSAGE AS RECEIVED ON PAGE PRINTER AT DC WAYSTATION

0214 P (IF TIME SIGNAL WAS SENT)
    TEXT
    #

2. A) TERMINAL STATION MESSAGE TAPE FORMAT SENDING TO MORE THAN ONE WAYSTATION

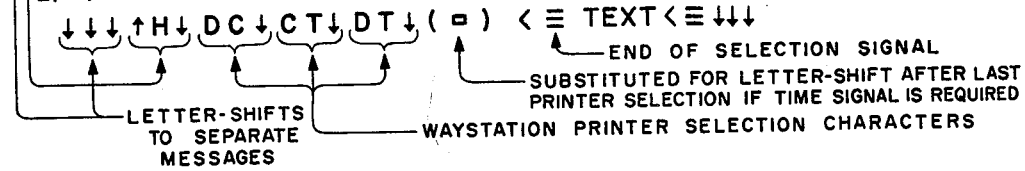

- END OF SELECTION SIGNAL
- SUBSTITUTED FOR LETTER-SHIFT AFTER LAST PRINTER SELECTION IF TIME SIGNAL IS REQUIRED
- WAYSTATION PRINTER SELECTION CHARACTERS
- LETTER-SHIFTS TO SEPARATE MESSAGES

B) MESSAGE AS RECEIVED ON PAGE PRINTER AT DC WAYSTATION

CT )T
    0214 P (IF TIME SIGNAL WAS SENT)
    TEXT
    #

3. WAY STATION MESSAGE TAPE FORMAT SENDING "UNIT OF WORK" TO TERMINAL STATION

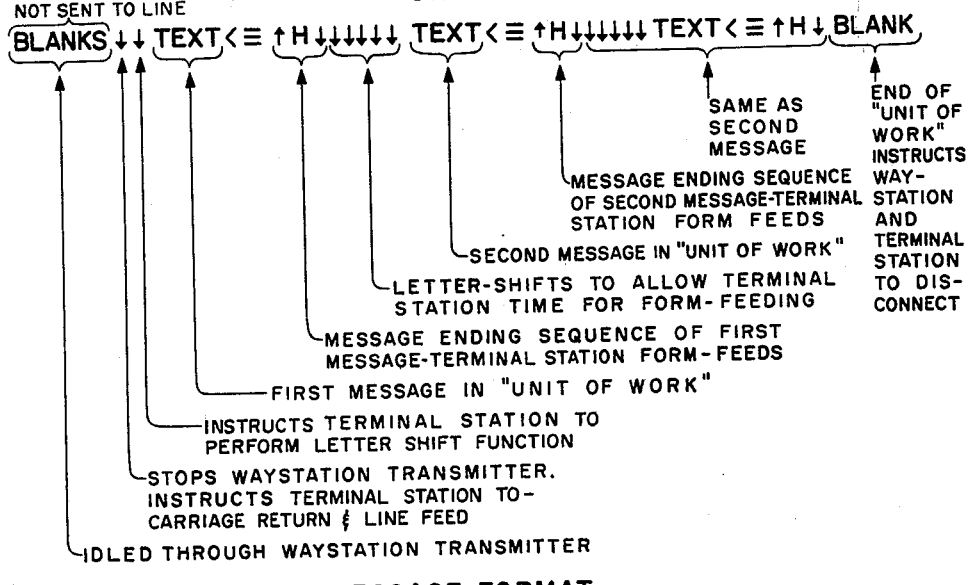

- SAME AS SECOND MESSAGE
- END OF "UNIT OF WORK" INSTRUCTS WAYSTATION AND TERMINAL STATION TO DISCONNECT
- MESSAGE ENDING SEQUENCE OF SECOND MESSAGE-TERMINAL STATION FORM FEEDS
- SECOND MESSAGE IN "UNIT OF WORK"
- LETTER-SHIFTS TO ALLOW TERMINAL STATION TIME FOR FORM-FEEDING
- MESSAGE ENDING SEQUENCE OF FIRST MESSAGE-TERMINAL STATION FORM-FEEDS
- FIRST MESSAGE IN "UNIT OF WORK"
- INSTRUCTS TERMINAL STATION TO PERFORM LETTER SHIFT FUNCTION
- STOPS WAYSTATION TRANSMITTER. INSTRUCTS TERMINAL STATION TO CARRIAGE RETURN & LINE FEED
- IDLED THROUGH WAYSTATION TRANSMITTER

MESSAGE FORMAT

United States Patent Office 3,134,848
Patented May 26, 1964

3,134,848
WAYSTATION SELECTION NETWORK
George G. Light, Scarsdale, and Edward F. Manning, Astoria, N.Y., John C. Parr, Bayonne, N.J., and Robert B. Wolfson, Elmhurst, N.Y., assignors to The Western Union Telegraph Company, New York, N.Y., a corporation of New York
Filed Mar. 14, 1961, Ser. No. 95,662
17 Claims. (Cl. 178—4)

This invention relates generally to a control network and more particularly to a network of stations responsive to control signals for the selective transmission of message signals.

It is an object of this invention to provide a device which operates at high rates of speed.

It is also an object of this invention to provide a terminal station to selectively regulate and control the transmission of message signals to and from remotely positioned waystations.

It is another object of this invention to provide a device which utilizes control signals which are not present in the message format and which are not made a part of the printed record of the message received.

It is still another object of this invention to provide a device which will permit only one waystation to transmit information to the terminal unit at any one particular instant.

It is an additional object of this invention to provide a network where the terminal stations can selectively initiate a reply from a waystation.

It is a further object of this invention to provide a device which will detect tape feed difficulties.

It is also a further object of this invention to provide a device which is reliable in operation and economical to build.

Figure 4B:
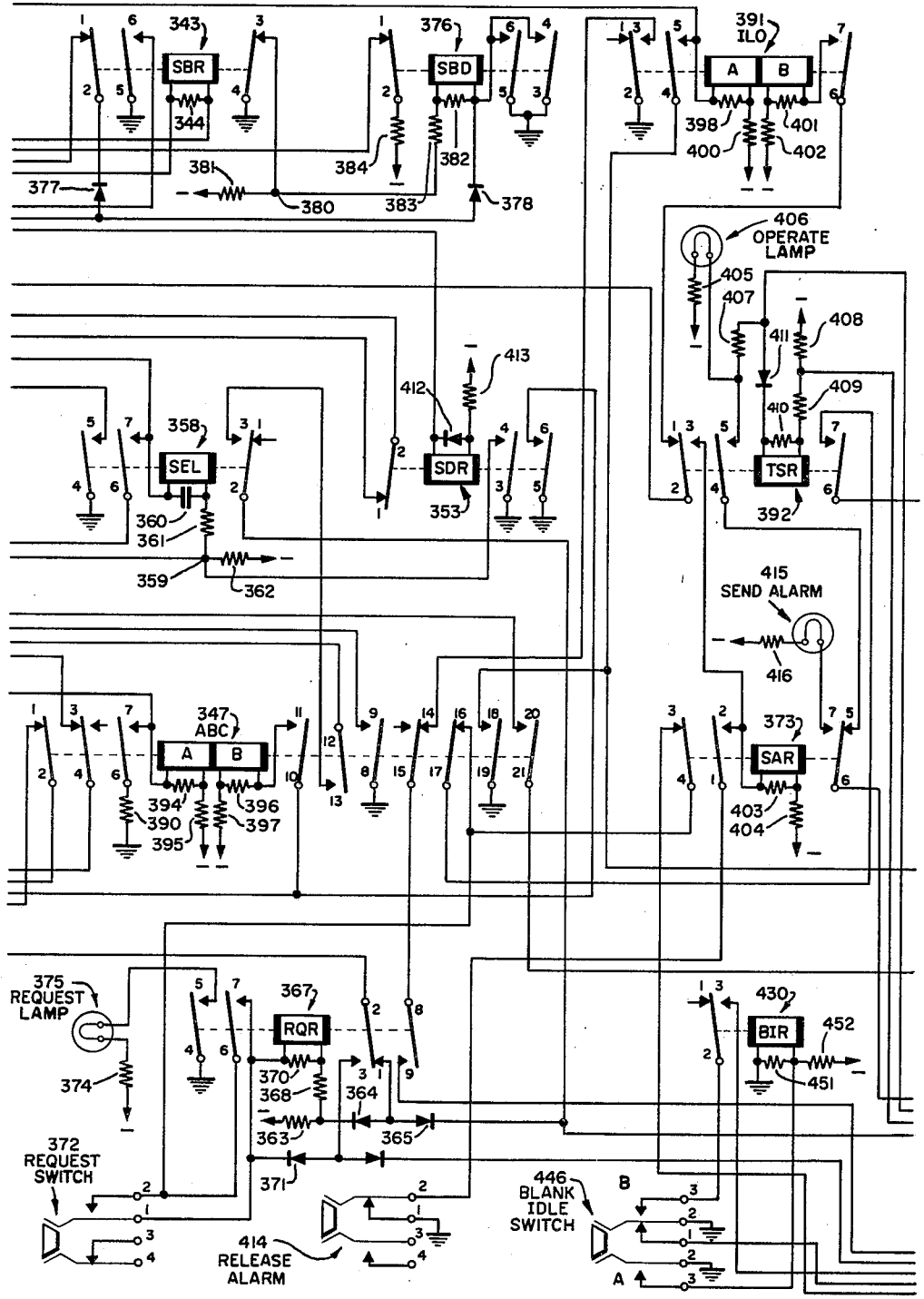

Other objects and many of the attendant advantages of this invention will be readily appreciated as the apparatus becomes better understood by reference to the following detailed description when considered in connection with the accompanying drawings wherein:

FIG. 1 is a block diagram of the structure of this invention illustrating an arrangement wherein one terminal station and two remotely positioned stations (waystations) are utilized;

FIGS. 2A, 2B, 2C, 2D, 2E, 2F, 2G, and 2H when assembled as indicated in FIG. 3 illustrate schematically the duplex way control network or terminal station;

FIGS. 4A, 4B, and 4C when assembled from left to right in that order as shown in FIG. 5 illustrate schematically the duplex way selector or waystation located at a position remote from the terminal station; and FIG. 6 illustrates message formats which can be used with the structure of this invention wherein 1A is for Terminal station message tape format when sending to a single waystation with selection answer back required; 1B is the message as received at the selected waystation; 2A is for Terminal station message tape format when sending to more than one waystation; 2B is the message as received at the waystation DC; and 3 is the waystation message tape format for sending a "unit of work" to the terminal station.

Similar reference characters refer to similar parts throughout the several views of the drawings.

Briefly, this invention relates to a waystation selection system which, while not limited to, finds particular adaptability towards utilization by stock brokerage firms where buy, sell, and other typically desired messages must be transmitted between a brokerage house which may be located in the vicinity of a stock exchange and its remotely located branch offices. These messages are normally characterized by their cryptic nature and require-ment for high accuracy. Additionally, because of the relatively rapid fluctuations in the price of stock it is imperative that all of the information that is received is handled promptly.

The terminal station supports the structure for controlling selectively the transmission of all messages which includes a signal transmitting means and a signal receiving means such as an Automatic Send-Receive set hereinafter referred to as an ASR set and a recording means which can be either a receiving only teleprinter hereinafter referred to as an RO teleprinter and/or a printer-perforator tape unit.

The waystations—those units located at areas remote from the terminal station support an ASR set which can either receive information from the line or transmit information to the line, and an RO unit which is used as a billing printer. The keyboard of the ASR set is used to prepare message tapes only—it is not used to transmit information directly to the line.

The terminal station regulates the transmission of all information to and reception from the individual waystations. Each waystation is invited sequentially by the terminal station to transmit all information it has stored on a tape. This is accomplished by means of a specific signal. The waystation, after it receives the invitation to transmit signals, first transmits back to the terminal station a signal which indicates whether or not the waystation has information that is to be transmitted.

When information is to be transmitted to one or more waystations, the terminal station will first transmit an identifying signal which will activate the desired waystation or waystations only, and then it will proceed to transmit the desired information. In some instances, however, the message transmitted from the terminal station to the waystation will require an answer. In this instance the message transmitted from the terminal station will be directed towards a single waystation only. Now, where an answer is required, the terminal station will continue to transmit the message to the selected waystation until it receives the answer requested. Upon receipt by the terminal station of the answer requested from the selected waystation, the terminal station will interrupt the transmission of the message and transmit an acknowledgement signal to the waystation. Thereafter, the terminal station will resume the transmission of the remainder of the message text. Transmission of the selection answer back signal by the waystation indicates to the terminal station that the waystation printer has a supply of paper and that the printer and selector are in proper working order.

*Operation of Terminal Station.*—In the transmission of information from the terminal station to the waystation, an operator stationed at the terminal station first prepares a message tape in the prescribed format and then positions the tape in a signal transmitter means such as a Model 28 ASR set manufactured by the Teletype Corporation of Chicago, Illinois. Transmission of the message is initiated by manually positioned a signal transmitter or transmitter-distributor switch to its start position. The operation of the transmitter will stop if the tape becomes tight or tears. If the transmitter stops operating because of a tight tape condition, it will restart automatically when the tight tape condition is corrected and the tape becomes slack. However, if the tape tears the operator must take appropriate action to permit continued transmission.

The terminal station transmitter can Pause or Stop briefly during the transmission of a message to permit the terminal station to transmit to the waystation special control character signals which are not incorporated on the tape. This Pause in transmission from the terminal station which occurs between the transmission of the message text and the control character signals is sensed by means which conditions the recording means or printers at the selected waystation and the recordings means or monitor printer at the terminal station to assume their non-print state. Thus, these printers will not print or copy the control characters transmitted.

If the message transmitted from the terminal station requires a selection answer-back, then that message can be transmitted to only one waystation. In this invention, the presence of the character "Q" at the start of a message which requires a selection answer back stops the transmission of information from any waystation which is transmitting to the terminal station. This procedure is required to insure that the sending leg from the waystation to the terminal station will be free to permit the clear transmission of the answer back signal. When the terminal station receives the selection answer back it Pauses and sends a control character—a carriage return signal—which indicates receipt of the answer back and restarts any stopped transmitter. The only time that the transmitter located at the terminal station Pauses is when the control character is sent.

If the terminal station fails to receive the selection answer back, or receives a wrong answer back then a no-answer lamp will be energized and the terminal station will transmit a control signal which will disconnect the waystation and restart any stopped transmitter. However, the tape must be reset manually to the beginning of the message and transmission must be initiated manually by depressing a no answer alarm release button.

*Reception from a Waystation.*—When a waystation has a message which is ready for transmission request means is activated to solicit permission from the terminal station to transmit message characters by transmitting an initiate signal. Invitation means at the terminal station, upon reception of the initiate signal, proceeds to poll all of the waystations on the circuit—each waystation transmitter being initiated to transmit. However, if the terminal station is sending a message at this time, it will pause briefly (unless it is in the process of transmitting the printer selection sequence) to transmit each invitation polling or cycling character, and then will continue with the transmission of the message which was interrupted. The terminal station can not transmit any invitation cycling characters during the waystation printer selection sequence.

The terminal station stops for approximately one hundred and fifty milliseconds to permit the transmission of each cycling character.

The Pause which occurs between characters of the message text and the transmission of the cycling character will condition any selected printer into its non-print case. Thus, the selected printers will not copy any of the cycling characters. However, after the waystation has received the cycling character then all selected printers will return to their print case to receive the rest of the message which will resume immediately after the cycling character.

Before cycling starts the terminal station transmits an initiate lock-out signal which will prevent any further initiate signals from being transmitted. This lock-out signal will be terminated after all of the stations have been cycled and have indicated that no station had a message to send.

The cycling for inviting transmitters to send consists of characters uniquely associated with each transmitter on the circuit. Ten transmitters can be provided for use with the following ten cycling characters: A, B, C, D, E, F, G, I, J and K however, additional transmitters can be provided if desired. Each transmitter responds to its particular cycling character with either a yes or no answer back.

If a waystation transmitter has a request to send stored information and it is not idling up to a message, then when it senses its cycling character it will respond with a yes answer back. The yes answer back consists of sending the message which was prepared and is waiting for transmission. However, if at the time that the cycling character is received a request is not stored or the transmitter is idling blank tape then the response to the received cycling character will be a No answer back which, in this instance is an X character.

Upon receipt of the No answer back the terminal station will Pause and invite the next transmitter to send. However, upon receipt of a yes answer back—an incoming message—a receive connect indicator lamp will be illuminated.

When the terminal station reads the end of transmission, or the end of a "unit of work" which is a Blank followed by an extended Rest Pulse it will then cycle the next transmitter. This procedure is continued until all transmitters have been invited to transmit to the terminal station.

If, after a waystation transmits a Blank to the terminal station it fails to disconnect itself, but instead continues to transmit—then the terminal station will transmit a signal which will energize disconnect means to disconnect and alarm the defective waystataion, and the terminal station will then proceed to invite the next waystation transmitter.

If, however, the terminal station does not receive the end of transmission signal—a Blank—and no incoming characters are received for approximately seven seconds, then the terminal station will also transmit a signal to energize the disconnect means which will alarm and disconnect the waystation, and the terminal station will then proceed to invite the next waystation transmitter to send.

If, for some reason transmission to the terminal station should stop for approximately seven seconds on two consecutive messages a Receive Transmission Tie-Up Lamp located at the terminal station will be energized. The invitation cycle is then stopped and messages will no longer be received until a Tie-Up Release Push Button Switch is pushed to permit the transmission of a control character to disconnect and alarm the waystation, and then invite transmission from the next waystation.

The transmitter invitation cycling for any waystation transmitter can be omitted by means of a station closeout switch associated with the transmitter.

*Operation of Waystation.*—The equipment located at a waystation controls the transmission to and reception from the terminal station and includes a signal transmitting and receiving means such as an Automatic Send-Receive set (ASR) and a recording means such as a receiving only teleprinter (RO printer). The typing usit of the ASR set is coupled to receive messages from the terminal station while the transmitter portion is coupled to send information to the terminal station and, therefore, can also function as a recording means. This last type of procedure is known as split ASR operation. The keyboard of the ASR set is used only for the preparation of tape—it is not used to transmit information directly to the line. The terminal station can transmit information to either the ASR printer or to the RO printer. It cannot transmit to both simultaneously.

The terminal station regulates all transmission to and reception from the individual waystation. Each station is invited sequentially by an invitation means at the terminal station to transmit any traffic it may have. Upon being invited a waystation that doesn't have any traffic to send will send to the terminal station an "X" character which is read by the terminal station as a "NO" answer back. However, if it does have a message to send it will automatically transmit the message as soon as it is invited. The reception of a character other than "X" by the terminal station is interpreted as a "yes" answer back.

If the terminal station has a message to send to a waystation, it will first select the recording means or printer to which it desires to send (either the ASR printer or the RO printer) and then it will send the message. The terminal station may or may not request a selection answer back from the waystation. The selection answer back is indicated in this application by the character "X."

The waystations end their transmission with a Blank which is the end of transmission signal to the terminal station.

The terminal station ends its transmission to the waystations with a message ending sequence. This sequence will be referred to as FIGS. H. Ltrs. it being understood, however, that other sequences can be used with equally acceptable results.

In the transmission of information from a waystation to the terminal station, the operator prepares the desired message in the prescribed format. Each unit of work begins with two "Ltrs. Shifts" and must end with a "Blank." The receiving printer at the terminal station will carriage return and line feed upon receiving the first letters shift from the waystation.

If there are any "Blanks" present in the tape before the start of the message, the transmitter clutch will operate to step the Blanks through the transmitter. If the Blanks do not automatically step through the transmitter a Blank idle push button must be depressed.

The operator can store a Request to send by depressing a "Request" push button after the message has idled up to the pins of the transmitter. The occurrence of this condition is indicated by the illumination of a "Request" lamp. The Request to send is stored in the selector until either a "tape out," "tight tape" or a manual transmitter switch is moved from the start position. The occurrence of either one of these conditions will deactivate the Request lamp. Thus, if a piece of tape is prepared with more than one message and is placed in the transmitter the Request push button need only be depressed once.

Request means at the waystation notifies the terminal station of its desire to transmit by transmitting an initiate signal—the character "X."

Upon receipt of the Initiate signal the invitation means at the terminal station will proceed to cycle all of the waystations on the way circuit—each transmitter being invited to transmit. To insure that the line will be free for this procedure the terminal station will Pause in the transmission of any message that it may be sending.

The Pause in the transmission of information from the terminal station which occurs between the termination of transmission of the message and initiation of the cycling urges the selected printer to assume its non-print case. Thus, the selected printer or printers will not copy any of the cycling characters. A Pause preceding any character indicates that the following character is a control character and is not a message character.

Before the actual cycling operation starts the terminal station will transmit a Pause—a "Y"—signal, the initiate lock-out signal to prevent further "request for cycling signals" (X) signals from being transmitted by the waystations. However, if there is no information ready for transmission from any of the waystations, the lock-out signal will be terminated.

The cycling for inviting waystation transmitters to transmit consists of characters uniquely associated with each transmitter on the circuit. Utilization of the ten characters A, B, C, D, E, F, G, H, I, and J will permit the use of ten transmitters.

Each transmitter will respond to its Invite call letter by either transmitting a message or a No answer-back (X) signal. If the transmitter sends a message an Operate lamp located on the selector is illuminated However, should the terminal station receive a NO answer-back signal it will then proceed to invite the next transmitter to send.

If transmission from the terminal station to the waystation has been interrupted for the transmission of the invitation cycling, it will now be resumed—the selected waystation printers having been urged to return to their print case to permit the copying of the remainder of the message.

The transmitter sends the entire message to the terminal station where it is examined continuously for the occurrence of a Blank signal which will indicate the End of Transmission signal. The waystation transmitter will stop operating after it transmits the Blank signal and the operate lamp will be extinguished.

If the terminal station fails to receive a message or a NO answer back (an X character signal) within 500 milliseconds after inviting a waystation to transmit, the terminal station will automatically proceed to invite the next waystation to transmit. If a waystation transmitter stops operating for approximately seven seconds during transmission the terminal station will send a signal to disconnect the waystation and energize a Send Alarm indicator lamp. A Release Alarm push button is provided to permit the operator to extinguish this lamp. However, the tape must then be reset in the waystation transmitter and a Request button pushed to permit the message that was interrupted to be again transmitted.

The message format transmitted from the terminal station to a waystation consists of a combination of signals which indicate desired functions. The message format is illustrated in detail in FIG. 6.

The message format transmitted from the terminal station can include a request for a Selection Answer Back. If the terminal station requests an answer back, it will stop any waystation transmitter that is sending in order to free its receiving line for the answer back. The terminal station will then select the desired waystation printer and drive it into its print case. The text of the message will then be transmitted.

Reply means at the waystation will generate and transmit a Selection Answer Back to the terminal station. Upon receipt of the Selection Answer Back the terminal station will Pause and transmit a Carriage Return signal which will restart any transmitter which was stopped. This Carriage Return signal will not be printed because the Pause will urge the selected printer to its nonprint case. The Carriage Return signal returns the printer to its print case and transmission of the message will resume. At the termination of the message the sequence "Fig. H. Letters" will be read and the waystation will assume its nonprint case.

The normal rest pulse interval between message characters is 20 ms. When it is desired to have the terminal station perform a control function, this rest pulse interval of 20 ms. is extended to 50 ms. and the desired control character is inserted immediately following the extended rest pulse. There is provided a first means, a first set of Off-Normal or Rest Pulse contacts and a second means or set of Common contacts. The Off-Normal contacts indicate the absence of a character and the common contacts provide a delayed indication of the termination of a character. The Off-Normal contacts close upon receipt of a rest (marking) pulse—the last pulse of a message character of the standard seven (or seven and one-half) pulse permutation code, and opens upon receipt of the first (spacing) pulse of the next occurring message character. Thus, the Off-Normal contacts first close at the termination of a message character and remain closed until the start of the next occurring message character. The Common contacts are urged to their closed condition by the last pulse of a message character. However, a delay means which is incorporated in the structure that supports the Common contacts (the stunt box) mechanically retards the closing of the common contacts for an interval of time slightly greater than 20 ms., and when they are operated they are cycled to their closed condition and then to their open condition—the complete cycling operation occurring within that interval of time allotted for the next occurring character.

Thus, only when there is an absence of a character will both the Rest Pulse Contacts and the Common contacts be closed simultaneously to indicate the interruption of characters, and this indication occurs within the time interval allotted for a single message character.

Simultaneous operation of the two sets of contacts urge the recorder means at the waystation into its nonprint state, and prints the insertion of control characters.

A clock means located at the terminal station feed time information to the transmitter to permit the time of Message transmission signals to be fed to the waystation immediately prior to the transmission of message characters.

*Detailed Description of the Terminal Station.*—With reference to FIGS. 1, and 2A–2H assembled as illustrated in FIG. 3 all information transmitted to the terminal station is fed to a Model 28 Receiving only (RO) Teleprinter which supports a stunt Box 30 having a plurality of contacts. The stunt box functions as a memory storage medium with a mechanism for translating discrete electrical pulse signals into mechanical motion. This motion, in turn, further initiates the closing or opening of particular electrical contacts to initate desired operations.

The stunt box 30 supports a plurality of normally open contacts 31 and 32; 33 and 34; 35 and 36; 41 and 42; 45 and 46; 50 and 51; and 52 and 53; and also supports a plurality of normally closed contacts 43 and 44; and 47 and 48. Additionally, there is provided a common movable contact 40 which assumes a normally closed condition with stationary contact 37, and a normally open condition with stationary contact 38. The movable contacts 31 and 35 are connected together and to the stationary contact 46; the three movable contacts 48, 50, and 52 are coupled together; and the stationary contacts 47 and 53 are coupled together.

The stationary contacts 47 and 51, and the movable contact 50 are provided to permit the addition of a receiving printer perforator if it is desired.

In this detailed description portion of the terminal station each of the switching means here illustrated as a relay is assigned a title which is descriptive of the functions which it performs.

Naturally, in this invention, contacts associated with any one particular relay are coupled also to contacts associated with other relays. In the detailed description which follows the connections to each relay will be described completely before a detailed reference to another relay will be made. However, when describing one relay it will be necessary to make reference to contacts of other relays. Therefore, to prevent the repetitious recitation of parts, those previously mentioned contacts will not again be mentioned when the relays to which they belong are described in detail. Thus, in the detailed description it will be indicated that a particular contact of a first relay is coupled to a particular contact of a second relay. Now, in the detailed description of the second relay the presence of this previously referred to contact will not be again indicated as any reference to it at this instance would merely be repetitious.

Now, continuing with the description, with reference to the Interrupted Transmission Relay (ITR) 55; contact 2 is coupled through a diode 56 to the stationary contact 43 located within the stunt box 30; contact 1 is coupled through the winding of a Common Reading Relay (CRR) 57 in shunt with impedance 58, and through an impedance 59 to a source of positive potential; contact 4 is coupled to contact 4 of relay 57; contact 3 is coupled through the B winding of a Message End Alarm Relay (MEA) 60 in shunt with an impedance 61, and through impedance 62 to a source of positive potential; contact 5 is coupled to contact 2 of relay 60; and contact 6 is coupled to contact 3 of relay 57. In the Common Reading Relay (CRR) 57; contact 8 is coupled to a ground terminal of an A.C. source of potential; terminal 7 is connected to terminal 3 of a Q, Line Feed Relay (QLF) 63; contact 1 is coupled through a diode 64 to the stationary contact 42 in the stunt box 30, and also to a seven second delay network 65; contacts 2 and 5 are coupled to a ground terminal; contact 12 is coupled to the more negative side of the winding of relay 57; contact 11 is coupled to contact 1 of an Invitation Close-Out Relay (ICO) 66; and contact 6 is coupled through a Receive Connect Indicating Lamp 67 to a source of positive potential.

Referring now to the Message End Alarm Relay (MEA) 60: contact 1 is coupled to the stationary contact 38 in the stunt box 30 and also to contact 10 of a Sending Alarm Relay (SAR) 68; contact 3 is coupled through a Receive Transmission Tie-up Lamp 70 which is amber in color to a source of positive potential; contact 6 is coupled to the contact 36 in the stunt box 30, contact 7 is coupled to a source of positive potential through an impedance 72 connected in series with the winding A of 60 connected in shunt with impedance 71; contact 5 is connected to the more negative side of its winding B; and contact 4 is coupled through a Tie-up Release Contact 73 to a ground terminal.

Referring now to the Q, Line Feed Relay (QLF) 63: contact 1 is connected to the contact 34 in the Stunt Box 30; contacts 2 and 5 are connected together and to contact 5 of the Receiving Alarm Relay (RAR) 73; contact 4 is coupled through a print case solenoid 74, located in the Receive Only unit to a source of A.C.; contact 6 is connected to the stationary contact 32 located within the Stunt Box 30; contact 7 is coupled through the winding of a Resume Sending Relay (RSR) 75 to a source of positive potential; contact 8 is coupled through a diode 76 to contact 5 of a Select Relay (SEL) 77, and to contact 8 of an Invitation Lock-Out Relay 78 of the knock down type; and contact 9 is coupled to a source of positive potential through an impedance 80 connected in series with an impedance 81 in shunt with the A winding of relay 63. Proceeding further with relay 63, contact 13 is coupled to a source of positive potential through an impedance 82 and an impedance 83 coupled in shunt with the winding B of relay 63 and a diode 84; contact 13 is further coupled through a diode 85 to contact 31 in Stunt Box 30, and to the contacts 1, and 3 through 25 in the C deck of a rotary invitation switch 86. Contacts 12, 14, 16 and 18 of relay 63 are connected to a ground terminal; contact 11 is coupled through diode 87 to the junction of diode 56 with contact 43; contact 10 is coupled to a 1.5 second time delay network 88, through the winding of the SAR 68 and No Answer Alarm Release contacts 90 to a source of positive potential, through a diode 91, contact 8 of relay 68 and a No Answer Lamp 92 which is read in color to a source of positive potential, and to contact 9 of a Select Print Case Relay (SPC) 93. Contact 13 of relay 63 is coupled to movable contact 41 of Stunt Box 30, it is also coupled through a diode 94 to the time delay network 88, and to contact 21 of a Rest Pulse Relay (RPR) 95. Contact 17 of relay 63 is connected to a terminal 96 which is coupled to contact 9 of relay 68 through a diode 97, to contact 2 of relay 66 through a diode 98, and also to contact 7 of a Time Request Relay 100. Contact 19 of relay 63 is coupled to contact 47 of the Stunt Box; contact 21 is coupled to contact 1 of relay 100; and contact 22 is coupled through a diode 102 to terminal 104.

The ASR set incorporates a Stunt Box 105 which supports a plurality of contacts 106 and 107; 108 and 109; 110 and 111, 112, 114, and 113; 115, 117, and 116; 118, 120, and 119; 121 and 122; 123 and 124; 125 and 126; 127 and 128; 129 and 130; 131 and 132; 133 and 134; 135 and 136. Each of the contacts 108, 110, 113, 116, 121, 123, 127, and 131 are coupled together and to a ground terminal, and each of the contacts 106, 120, 125 and 135 are coupled together and to contact 4 of relay 100, to contact 6 of relay 77, and to contact 4 of a Q relay (QR) 138.

With reference to the Receiving Alarm Relay 73, contact 1 is coupled to a source of positive potential through an impedance 140 and the winding of relay 55 in shunt with a capacitor 141, cooperating contact 2 is coupled to the Time Delay network 64; contact 5 is coupled to contact 6 of a Receiving Alarm Control Relay 142 of the knock down type, and cooperating contact 4 is connected to a ground terminal. The winding of relay 73 is connected in shunt with a capacitor 143 and interposed between a one second time Delay network 144 and contact 1 of relay 95.

In the Sending Alarm Relay 68 contact 7 is connected to a ground terminal; contact 2 is coupled through an impedance 145 to a ground terminal; contact 1 is coupled to contact 1 of relay 75 and to contact 3 of a Send Stop Relay (SSR) 146; contact 3 is coupled to contact 1 of an Auto Stop Control Relay 147; and contact 4 is coupled to contact 3 of relay 78, to the first step of B deck of a Time Program rotary type switch 148, to a Clock Disconnect switch 150, to terminal 5 of a First Distributor Clutch Release Relay (DCR–1) 151, and to terminal 8 of a second Distributor Clutch Release Relay (DCR–2) 152.

In the Invitation Lock Out Relay 78, contact 9 is coupled to a source of positive potential through winding A in shunt with an impedance 153 and in series with an impedance 154; contact 8 is coupled through a diode 155 to contact 1 of relay 138, to contact 7 of relay 75, and to a source of positive potential through the winding of a Send Connect Relay (SCR) 156 connected in shunt with an impedance 157 and in series with an impedance 158; contact 7 is coupled to stationary contact 111 in the ASR set and to a source of positive potential through the B winding of relay 78 connected in shunt with an impedance 160 and in series with an impedance 161. Contact 6 which cooperates with contact 7 is coupled to contact 2 of relay 75; contact 5 which is selectively connected to a ground terminal through contact 4 is coupled to station close-out switches 162, 163, 164, and 165, to the steps 13–25 of deck C of the Invitation Switch 86, and to a source of positive potential through an impedance 166. Contact 2 of relay 78 selectively couples contact 3 a ground terminal.

Referring now to the Receiving Alarm Control Relay (RAC) 142, contact 5 is coupled to a source of positive potential through winding B coupled in shunt with an impedance 167 and in series with an impedance 168. Contact 4 is coupled in a similar manner through winding A, and impedances 170 and 171 to a source of positive potential; and is also coupled to contact 19 of relay 95. Contact 3 which cooperates with contact 4 is coupled directly to contact 4 of relay 55, and through a diode 172 to contact 7 of relay 146. Contact 2 is connected to a ground terminal and contact 1 is coupled to the Time Delay network 144.

An Invitation Close-out switch 173 is coupled to contacts 3, 5, and 7 of the Invitation Close-out relay 66, to contact 37 in the RO Teleprinter Stunt box 30, to contact 5 of relay 73, and to contact 2 of a Power On Relay (POR) 174. An Invitation Close-Out indicator lamp 175 which is red in color is interposed between the switch 173 and a source of positive potential through an impedance 176 to indicate the position of the switch. Returning to relay 66 contact 7 is coupled to a source of positive potential through a diode 177 coupled in series with impedance 178, 180 and 182, the winding of relay 66 being connected in parallel with impedance 178. Contact 6 which cooperates with contact 7 is coupled to a ground terminal; and contact 4 is coupled through a diode 180 to an Incoming Message Disconnect Switch 181.

In relay 138, contact 5 is coupled to contact 107 in the ASR set Stunt Box 105, and to a source of positive potential through the winding of relay 138 coupled in shunt with impedance 182 and in series with impedance 183. Contact 3 is coupled to the anode terminal of diode 84 associated with relay 63, and contact 2 is coupled to contact 109 in the Stunt Box 105 of the ASR set.

Referring now to relay 77, the Select Relay (SEL) contacts 7 and 2 are coupled to a ground terminal, contact 8 is coupled through an impedance 184 to contact 118 of Stunt Box 105, and contact 3 is coupled to a three second Time Delay Network 185. Contact 9 is coupled to contact 114 in Stunt Box 105, and to a source of positive potential through an impedance 186 coupled in shunt with winding A of relay 77 and in series with an impedance 187. Contact 4 is coupled to a source of positive potential through an impedance 188 coupled in shunt with winding B of relay 77 and in series with impedance 190. Contact 1 is coupled directly to contact 126 in Stunt Box 105 and through impedances 191 and 192 to the time delay network 185. The junction of the impedances 191, 192 is coupled to a source of positive potential through an impedance 193 and to a ground terminal through a capacitor 194.

Proceeding to relay 93—the Select Print Case Relay (SPC) contact 4 is coupled through the print Case Solenoid 137 in the ASR set to a source of alternating current, contact 5 is connected to an A.C. ground terminal in the source of A.C. contact 2 is coupled through a diode 199 to contact 130 in the ASR set and to contact 4 of relay 95, and contact 3 is coupled through a diode 195 to contact 3 of a Maintenance Control Relay (MCR) 196 and through a Maintenance Seize Lamp 197 which is amber in color to a source of positive potential. Contact 3 is also coupled to contact 129 located in Stunt Box 105 and to a source of positive potential through a capacitor 197 in shunt with the winding of relay 93 and in series with an impedance 198.

With regard to relay 196 contact 2 is connected to a ground terminal, contact 4 is coupled to contact 112 located in Stunt Box 105 and to contact 4 of relay 956, and contact 5 is coupled to contact 128 of Stunt Box 105. Contact 5 is also coupled to a source of positive potential through an impedance 200 coupled in shunt with the winding of relay 196 and in series with impedance 201.

Looking at relay 100, contacts 6 and 8 are coupled to ground terminals, and contact 5 is coupled to Time Relay Network 185 and through a capacitor 202 connected in shunt with the winding of relay 100 to the junction of the No Answer Alarm Release 90 with the winding of relay 68. Contact 2 is coupled to contact 14 of relay 146, to terminal 147 through diode 148 and to terminal 150 through diode 151.

With reference to relay 151—First Distributor Clutch Release Relay (DCR)—contacts 4 and 2 are coupled to a ground terminal, contact 1 is coupled to contact 11 of a Blank Send Relay (BSR) 203, and contact 7 is coupled to contact 1 of relay 203. Contact 7 is also coupled to contact 6 of relay 152, to contact 14 of a Homing Relay (HR) 203, and to the sliding contact of deck D of the Time Program Rotary Switch 148. Contact 6 is coupled to contact 5 of relay 152; to a source of positive potential through a capacitor 204 coupled in shunt with the winding of a Distributor Start Relay (DST) 205 and in series with an impedance 206; and through Auxiliary Contacts 207 located in the distributor 208 to a ground terminal. Contact 6 is also coupled to contact 5 of relay 203 and to contact 9 of relay 95.

In the Second Distributor Clutch Release Relay (DCR–2) 152, contacts 7, 1, 4, 11, and 13 are coupled to ground terminals. Contact 2 is coupled directly to contact 11 of a Send Invitation Character Relay (SIC) 208 and through a diode 210 to contact 6 of a Distributor Send Control Relay (DSC) 211. Contact 3 is coupled through contact 17 of relay 95 to contact 1 of a Distributor Clutch Control Relay (DCC) 212. Contact 10 is coupled to contact 33 located in the Stunt Box 30 of the RO unit. Contact 9 is connected to the step 2 on deck C of the Invitation Rotary Switch 86, and contact 14 is connected to contact 7 of relay 211. Contact 12 is coupled through a diode 213 to contact 11 of relay 74, and contact 12 is also coupled through a diode 214 to contact 10 of relay 146 and to contact 1 of relay 208.

Proceeding to relay 174—Power On Relay (POR), contact 3 is coupled to the movable contact of deck D of the Invitation Rotary Switch 86; contacts 4 and 7 are coupled to ground terminal; and contact 5 is coupled to contact 3 of relay 205. Contact 6 is coupled to a source of positive potential through contact 12 of relay 203, an impedance 215 connected in shunt with the winding of relay 203, an impedance 216, and another impedance 217; and contact 6 is also coupled to step 1 of deck D of the Invitation Switch 86. Contact 8 is coupled to contact 10 of relay 57; contact 1 is coupled to contact 6 of relay 203 and to contact 10 of relay 95; contact 10 is coupled to contact 2 of relay 205; and contact 9 is coupled to contact 14 of relay 95. A source of positive potential is coupled through an impedance 216 in series with impedance 217 in shunt with the winding of relay 174 to terminal 218. Terminal 218 is coupled to contact 8 of relay 174 through a diode 220 connected in series with an impedance 221. Terminal 218 is also coupled through a diode 222 to step 3 of deck K of the Invitation Switch 86, and to contact 5 of relay 208. The cathode terminal of diode 222 is coupled through a diode 223 to the junction of impedances 182 and 180 in the circuit of relay 66.

In relay 203—the Blank Send Relay (BSR), contacts 7, 9, and 3 are coupled to ground terminals; contact 10 is coupled through the winding of relay 151 connected in shunt with an impedance 223 to contact 3 of relay 212; and contact 8 is coupled through contact 7 of relay 95 to a source of positive potential through the winding of a Transmitter Connect Control Relay (TCC) 224 connected in shunt with a capacitor 225 and in series with an impedance 226. Contact 2 is connected to contact 8 of relay 95, and contact 4 is coupled through contact 9 of relay 146, contact 14 of relay 75, and contact 7 of relay 208 to steps 2, 3, 5, 6, 7, 8, 9, 10, 11, 12, and 13 of deck B of the Time Program Rotary Switch 148. Contact 4 is also coupled to contact 5 of relay 205 and to a source of positive potential through the Distributor magnet winding 227. Positioned between the negative side of the Distributor magnet winding and a ground terminal is a capacitor 228 in series with a resistor 230.

Referring now to the Rest Pulse Relay (RPR) 95, contacts 6, 3, and 12 are connected to ground terminals. Contact 2 is coupled to a source of positive potential through an impedance 231 and contact 10 is coupled through a diode 232 to contact 4 of relay 212 and to a source of positive potential through the winding of relay 212 in parallel with an impedance 232 and in series with an impedance 233. Contact 11 is coupled through a diode 233 coupled in series with the winding of relay 152 in shunt with an impedance 234 to contact 3 of relay 212. Contact 11 is also coupled to contact 2 of relay 211. Contact 13 is coupled to contacts 13 and 18 of relay 208, to contact 10 of relay 75, to contact 14 of relay 146, and to contact 1 of relay 205. Contact 14 is coupled to contact 134 in the ASR set, and to a source of positive potential through the winding of relay 95 in shunt with a capacitor 235 and in series with impedances 236 and 166. Contact 15 is coupled to contact 2 of relay 212; contact 16 is coupled to contact 6 of relay 208, to contact 13 of relay 75; and to contact 6 of relay 146; and contact 18 is coupled to contact 5 of relay 75. Contact 20 is coupled to contacts 1 and 8 of relay 146, and contact 22 is coupled to the Incoming Message Disconnect Switch 181.

In the Send Stop Relay (SSR) 146, contact 18 is coupled to contact 2 of relay 66, contact 19 is connected to contact 3 of relay 208, and contact 3 is coupled to contact 7 through a diode 235. Contact 4 is coupled to a ground terminal through an impedance 236, and contact 2 is coupled to contact 15 of relay 75. Contacts 17, 24, and 20 are coupled to ground terminals, contact 16 is coupled through contact 8 of relay 75, to contact 11 of relay 208, and contact 15 is coupled to contact 12 of relay 208 and contact 4 of relay 211. Contact 11 is coupled to the Incoming Message Disconnect Switch 181, to contact 1 of relay 60, and to a source of positive potential through the winding of relay 146 connected in shunt with a capacitor 237 and in series with an impedance 238. Contact 12 is coupled to contact 4 of relay 75; contact 13 is coupled to contact 25 of relay 208; contact 15 is coupled to contact 23 of relay 208, contact 22 is coupled to contact 20 of relay 75; and contact 21 is coupled to contact 19 of relay 208.

With reference to the Resume Sending Relay (RSR) 75; contacts 9, and 18 are coupled to ground terminals; contact 16 is coupled to contact 9 of relay 208; and contact 17 is coupled to contact 16 of relay 146, to a source of positive potential through the winding of relay 211 connected in shunt with a capacitor 240 and in series with an impedance 241, and to contact 8 of relay 211. Contact 19 is coupled to contact 17 of relay 208; and contact 6 is coupled through a first diode 240 to a terminal 241, and through a second diode 242 to a terminal 243.

Proceeding to the Send Invitation Character Relay (SIC) 208, contacts 4, 10, and 22 are coupled to ground terminals. Contact 2 is coupled through a diode 244 to contact 6 of relay 211, contact 8 is coupled through switch 163 to step 4 of deck A of the Invitation Switch 86, and contact 24 is coupled to the movable contact arm of each deck E, F, G, H and J of the Invitation Switch 86. Contact 21 is coupled to contact 5 of relay 212; contact 20 is coupled to a ground terminal through a capacitor 245 connected in series with an impedance 246, and is also coupled to a source of positive potential through the winding of the step relay 247 and an impedance 248. Contact 16 is coupled to the Clock Disconnect Switch 150 and to the movable contact arm of deck B of the Time Program Rotary Switch 148. Contact 15 is coupled to the Incoming Message Disconnect Switch 181 and also to a source of positive potential through the winding of relay 1208 connected in shunt with an impedance 250 and in series with an impedance 251.

In relay 212, contact 6 is coupled to contact 1 of relay 211; and, in relay 211 contact 5 is coupled to a ground terminal.

With reference to the Continue Invitation Cycling Relay (CIC) 252 which is of the knock down type, contact 5 is coupled to a ground terminal and contact 4 is coupled to contact 9 of relay 57 and also to a source of positive potential through winding A of relay 252 connected in shunt with an impedance 253 and in series fashion with impedances 254, 255. Contact 9 is coupled to the movable contact arm of deck K of the Invitation Switch 86, contact 6 is coupled to steps 1 and 2 of deck B of the Invitation Switch 86, and contact 7 is coupled to each of the Station Close-out Switches and to steps 13–26 of deck A of the Invitation Switch 86. Contact 8 is coupled to a source of positive potential through winding B of relay 252 coupled in shunt with impedance 256 and in series with impedance 257.

With respect to the Time Request Control Relay (TRC) 258, contacts 2 and 4 are connected to the Clock Disconnect Switch 150, contact 3 is coupled through the Aux. Contacts B260 in the transmitter section of the ASR set to a ground terminal. Contact 5 is coupled to contact 136 in the ASR set Stunt Box 105, and is also coupled to a source of positive potential through the winding of relay 258 in shunt with impedance 261 and in series with an impedance 262.

Referring now to the Transmitter Connect Control Relay (TCC) 224, contact 1 is coupled to terminal 150, contact 3 is coupled to terminal 241, contact 5 is coupled to terminal 147, contact 7 is coupled to terminal 243, and contact 9 is coupled to terminal 104. Contact 2 is coupled to contact 10 of relay 203 and to the movable contact of deck J of the Time Program Switch 148. Contact 4 is coupled to contact 8 of relay 203 and to the movable contact of deck H of the Time Program Switch 148. Contact 6 is coupled to contact 6 of relay 203 and to the movable contact of deck G of the Time Program Switch 148. Contact 8 is coupled to contact 4 of relay 203 and to the movable contact of deck F of the Time Program Switch 148. Contact 10 is coupled to contact 2 of relay 203 and to the movable contact of deck E of the Time Program Switch 148. Contact 12 is coupled to step 4 of deck C of the Time Program Switch 148 and contact 11 is coupled to the start contact of the Clock Time Transmission unit.

Referring now, specifically to the Homing Relay (HR) 203, contact 3 is coupled to transmitter unit of the ASR set and to step 1 of deck E of the Time Program Switch 148; contact 5 is coupled to the transmitter unit of the ASR set and to step 1 of deck F of the Time Program Switch 148; contact 7 is coupled to the transmitter units of the ASR set and to step 1 of the deck G of the Time Program Switch 148; contact 9 is coupled to the transmitter unit of the ASR set and to step 1 of deck H of the Time Program Switch 148; and contact 11 is coupled to the transmitter unit of the ASR set and to step 1 of deck J of the Time Program Switch 148. Contact 12 is connected to a ground terminal and contact 13 is coupled to steps 14–25 of deck C of the Time Program Switch 148. Contact 15 is coupled to a source of positive potential through the transmitter magnet 263, to a ground terminal through a capacitor 264 in series with an impedance 265, and to step 1 of deck D of the Time Program Switch 148.

In the Time Program Switch 148, step contacts 14–25 of deck A are coupled together and to a source of positive potential through the winding of relay 203 connected in shunt with a diode 266 and in series with an impedance 267. Step contacts 5–11 of deck A are coupled together and to the Clock Time Transmission Unit. Step contacts 2–13 of deck D interposed between and coupled to a ground terminal through a capacitor 269 and an impedance 270, and a source of positive potential through the movable contact 1 and the winding of the step relay 268. The step contacts 11, 9, 8, 7, and 6 of each deck E, F, G, H, and J are coupled to the Clock Time Transmission Unit. The step contacts following are each coupled to each other and to a ground terminal: step contacts 10, and 3 of deck E; step contacts 12, 10, and 3 of deck F; step contact 10 of deck G; step contacts 13, 10, 3, and 2 of deck H; and step contacts 10, and 3 of deck J. In deck A the movable contact is coupled to a ground terminal; step contact 1 is coupled to the Clock Disconnect Switch 150; and step contact 20 is coupled through contact 2 of step relay 268 to the movable contact of deck C. The step contact 1 of deck C is coupled to the Clock Disconnect Switch 150.

With reference to the Invitation Rotary Switch 86, step contacts 1–26 of deck A and 1–25 of deck B are coupled to the Station Close-Out switches. The movable contacts of decks A and B are coupled to ground terminals. In deck C, step contacts 1–25 are coupled together. In deck D, step contacts 2–12 are coupled together and are coupled to step contact 26 of deck A and to contact 1 of step relay 247. In deck E, step contacts 1, 2, 4, and 9 are interconnected and coupled through a diode 268 and terminal 104 to the #5 contact of the distributor 208 of the ASR set. In deck F step contacts 4, 5, 6, 8, 9, 11, and 12 are interconnected and coupled through diode 270 and terminal 243 to the #4 contact of the distributor 208. In deck G step contacts 2, 5, 8, 10, and 12 are interconnected and coupled through diode 271 and contact 147 to the #3 contact of the distributor 208. In deck H step contacts 1, 3, 5, 9, 10, 11, and 12 are interconnected and coupled through diode 272 and contact 241 to the #2 contact of the distributor 208. In deck J step contacts 1, 2, 3, 4, 6, 7, 8, 11 and 12 are interconnected and coupled through diode 273 and contact 150 to the #1 contact of the distributor 208.

The Stop contacts of the distributor 208 are interposed between the Keyboard signal Generator coupled in shunt with the Maintenance Switch and the winding of the Monitor relay 274 and the Transmitter relay 275. The movable contact 1 of the transmitter relay is coupled to the waystation and cooperates with stationary contact 2 to generate a spacing signal and stationary contact 3 to generate a marking signal. In this invention as illustrated in the Partial Schematic of the ASR set a tape-out switch 276 and a start-stop and tight tape switch 277 are also provided.

In the Auto Stop Control Relay (ASC) 147 contact 2 is coupled to a ground terminal through the transmitter section of the ASR set; and the winding is coupled in shunt with a capacitor 278 and interposed between a source of positive potential through a resistor 279 and contacts 6 and 7 of relay 205 and a Thyratron network 280. The Thyratron network is coupled to the Start-Stop and Tight Tape switch 277 and to contact 4 of relay 205.

In the Send Connect Relay (SCR) 156 contact 5 is coupled to the more negative side of the winding; contact 3 is coupled to a source of positive potential through a Send Connect Lamp 281 which is green in color connected in series with a resistor 282. Contact 2 is connected to a ground terminal.

*Detailed description of waystation.*—The circuit of the waystation network supports a Model 28 ASR set, and a Model 28 RO Teleprinter and switching means. In this portion of the detailed description as in that for the terminal station, the switching means are here illustrated as relays and are assigned titles which are descriptive of the functions which they perform. Additionally, as with the detailed description of the Terminal Station, contacts associated with any one particular relay are coupled frequently to contacts associated with other relays. Therefore, all of the connections to each relay will be referred to before detailed reference to another relay will be made, and then only those contacts or electrical paths not previously mentioned will be indicated. In this manner the repetitious recitation of parts and electrical paths will be avoided.

With reference to FIGS. 4A, 4B and 4C assembled in that order from left to right as indicated in FIG. 5, there is an ASR set 300 which supports a plurality of contacts 301–308, 310–332, 335–338, 340, and 341.

With reference to the Maintenance Seize Relay (MSR) 342 contact 1 is coupled to contact 303 of the ASR set 300, and through the winding of the Stunt Box Relay (SBR) 343 coupled in shunt with an impedance 344 to contact 5 of the Stunt Box Control Relay (SBC) 345. Contact 2 is coupled to a ground terminal; and contact 3 is coupled to contacts 319 and 324 of the ASR set 300, and through contact 3 of a First Select Call Relay (SCR–1) 346 to contact 3 of an Answer Back Control Relay (ABC) 347 of the knock down type supporting windings A and B. Contact 3 of relay 346 is also coupled to a source of negative potential through its associated winding coupled in shunt with a capacitor 348 and in series with an impedance 350. Contact 4 of relay 342 is coupled through a diode 351 to contact 2 of relay 346 and contact 2 of a Second Select Call Relay (SCR–2) 352, and is also coupled to contact 1 of a Select Disconnect Relay (SDR) 353. Contact 5 of relay 342 is coupled to contact 310 of the ASR set 300 and to a source of negative potential through its associated winding coupled in shunt with an impedance 354 and in series with an impedance 355.

In the First Select Call Relay (SCR–1) 346 contact 4 is coupled to contact 4 of relay 352 and through the winding of a Print Case Relay (PCR) 356 coupled in shunt with a capacitor 357 and in series with an impedance 358 to a source of negative potential. Contact 5 is coupled to contact 1 of relay 345 and contact 5 of relay 352; contact 7 is coupled to contact 7 of relay 352 and contact 3 of relay 356; and contact 6 is coupled through the Print Case Solenoid 333 coupled in shunt with capacitor 334 to a source of A.C. potential. Contact 9 is coupled to contact 327 in the ASR set and to contact 9 of relay 352; and contact 8 is coupled to contact 8 of relay 352 and contact 12 of relay 347. Contact 11 is coupled to contact 11 of relay 352 and to contact 9 of relay 347. Contact 10 is coupled to contact 325 in the ASR set 300, to contact 10 of relay 352, and to contact 6 of a Select Relay (SEL) 358. Contact 13 is coupled to contact 13 of relay 352 and through a terminal 359 to contact 4 of relay 353; and contact 12 is coupled to contact 12 of relay 352 and to contact 20 of relay 347.

Referring to the Select Relay (SEL) 358 contact 7 is coupled to a source of negative potential through the winding of relay 358 coupled in shunt with a capacitor 360 and in series with an impedance 361, the terminal 359 and another impedance 362. Contact 7 is also coupled to contact 317 in the ASR set 300. Contact 5 is coupled to contacts 321, 323, 331 and 337 in the ASR set 300, and contact 4 is coupled to a ground terminal. Contact 3 is coupled to contact 13 of relay 347; and contact 2 is coupled to a source of negative potential through the series combination of an impedance 363 and two diodes 364, 365, and contact 2 is also coupled to contacts 11 and 5 of a Message Waiting Relay (MWR) 366. The point common to the diodes 364, 365 is coupled to contact 1 of a Request Relay (RQR) 367, and the point common to the impedance 363 and the diode 364 is coupled through an impedance 368 connected in series with the winding of relay 367 connected in shunt with an impedance 370 to contact 7.

Continuing now with the Request Relay 367, contact 3 is coupled through a diode 371 to contact 7 and to a first contact of a Request Push button with 372. Contact 6 is coupled to the second contact of the Request Push Button Switch 372 and also to contact 16 of relay 347 and to contact 4 of a Sending Alarm Relay (SAR) 373. Contact 5 is coupled to a source of negative potential through an impedance 374 coupled in series with a Request Lamp 375 which is white in color; contact 4 is coupled to a ground terminal; and contact 7 is coupled to contact 10 of relay 366; and contact 8 is coupled to contact 15 of relay 347. Contact 2 is coupled to contact 346 of the ASR set 300.

In the Stunt Box Control Relay (SBC) 345, contact 6 is coupled through the coil of the relay (345) connected in shunt with an impedance 375 to contact 1 of a Stunt Box Disconnect Relay (SBD) 376, to contact 307 of the ASR set 300, and to the adjacent stationary contact 4. Contact 2 is coupled to a ground terminal and contact 3 is coupled to contact 1 of relay 343.

Examination of the Stunt Box Relay (SBR) 343 reveals that contact 2 is coupled through a first diode 377 and a second diode 378 to contacts 6 and 4 of relay 376; and the junction common to the two diodes 377, 378 is coupled to contact 305 in the ASR set 300. Contacts 4 and 5 are coupled to ground terminals; contact 6 is coupled to contacts 301, 308, 311, 313, 335, and 340 in the ASR set 300; and contact 3 is coupled through a terminal 380 and an impedance 381 to a source of negative potential. The terminal 380 is coupled to contact 6 of relay 376 through the winding of relay 376 connected in shunt with an impedance 382 and in series with an impedance 383.

Contacts 3 and 5 of relay 376 are coupled to a ground terminal and contact 2 is coupled to a source of negative potential through an impedance 384.

In the Answer Back Control Relay (ABC) 347, contact 1 is coupled to contact 338 in the Stunt Box of ASR set 300 and to the Form Out Indicator contacts 385 located in Billing RO Teleprinter 386; contact 2 is coupled to contact 3 of relay 353, to a source of negative potential through the winding of relay 352 coupled in shunt with a capacitor 387 and in series with an impedance 388, and to the Form Out Indicator contacts 385 in the RO printer 386. Contact 4 is coupled to contacts 320 and 322 in the Stunt Box of the ASR set 300; contact 6 is coupled to a ground terminal through an impedance 390; and contact 7 is coupled to contact 332 in the Stunt Box of the ASR set 300. Contacts 8 and 19 are coupled to ground terminals; contact 10 is coupled to contact 336 in the Stunt Box of the ASR set 300, and to contact 6 of relay 353; contact 14 is coupled to contact 3 of an Initiate Lock Out Relay (ILO) 391 which is of the knock down type; Contact 17 is coupled to contact 7 of a Transmission Start Relay (TSR) 392; contact 21 is coupled to contact 3 of a Distributor Clutch Stop Relay (DCS) 393; and contact 18 is coupled to contact 4 of relay 391 and contact 1 of relay 393. Contact 7 is coupled to a source of negative potential through the A winding of relay 347 coupled in shunt with an impedance 394 and in series with an impedance 395; and contact 11 is coupled to a source of negative potential through the B winding of relay 347 coupled in shunt with an impedance 396 and in series with an impedance 397.

With reference to relay 391, contact 2 is coupled to a ground terminal; contact 6 is coupled to contact 1 of relay 392; and contact 5 is coupled to contact 302 in the Stunt Box of the ASR set 300. Contact 5 is also coupled to a source of negative potential through the A winding of relay 391 coupled in shunt with an impedance 398 coupled in series with an impedance 400. Contact 7 is coupled to a source of negative potential through the B winding coupled in shunt with an impedance 401 coupled in series with an impedance 402.

In the Transmission Start Relay (TSR) 392 contact 2 is coupled to contact 314 of the Stunt Box of the ASR set 300; contact 3 is coupled to a source of negative potential through contact 2 of relay 373, the winding of relay 373 coupled in shunt with an impedance 403 coupled in series with an impedance 404; contact 4 is coupled to contact 5 of relay 373; and contact 6 is coupled to contact 4 of relay 393. Contact 5 is coupled to a source of negative potential through an impedance 405 and an Operate Lamp 406 which is green in color. Contact 5 is also coupled through an impedance 407 to contact 7 of relay 366. The junction point of the resistor 407 with contact 7 of relay 366 is coupled to a source of negative potential through three impedances 408, 409, 410 and a diode 411 coupled to form a series circuit the winding of relay 392 being coupled in shunt with impedance 410. The junction of impedances 408, 409 is coupled to contact 3 of relay 366.

Referring to relay 353, contacts 3 and 5 are coupled to ground terminals; contact 2 is coupled to contact 314 in the Stunt Box of the ASR set 300; and the winding of relay 353 is coupled in shunt with a diode 412 and interposed between the contact 312 in the Stunt Box of the ASR set 300 and a source of negative potential through an impedance 413.

Proceeding to the Sending Alarm Relay (SAR) 373, contact 3 is coupled to contact 2 of relay 366 and through the Start-Stop and Tight Tape switch 314 and the Tape Out Switch 315 in the ASR set 300 to a ground terminal. Contact 1 is coupled to a ground terminal through a Release Alarm Push Button switch 414; contact 7 is coupled to a source of negative potential through a Send Alarm Indicator light 415 which is red in color coupled in series with an impedance 416; and contact 6 is coupled to contact 8 of relay 366 and contact 1 of an End of Message Relay (EOM) 417.

Referring now to the Distributor Clutch Stop Relay (DCS) 393, contact 5 is coupled through a crystal diode 417 to contact 12 of a Distributor Clutch Relay (DCR) 418; contact 2 is coupled to a ground terminal; and contact 8 is coupled to a ground terminal through the winding of a Distributor Clutch Disconnect Relay (DCD) 419 coupled in shunt with an impedance 420. Contact 7 is coupled to a source of negative potential through the winding of relay 393 coupled in shunt with an impedance 421 and in series with impedances 422, 423. Contact 7 is also coupled to contact 9 of relay 418; and the junction of the two impedances 422, 423 is coupled to contact 13 of relay 418.

In the Distributor Clutch Relay (DCR) 418, contacts 14, 6, 3, 15, and 20 are coupled to ground terminals; contact 12 is coupled through a diode 424 to the Line Test Switch 425 in the ASR set 300; contact 11 is coupled to contact 1 of relay 419; and contact 8 is coupled through Auxiliary Contact "C" 426 in the ASR set 300 to a ground terminal. Contact 5 is coupled to contact 5 of the Distributor of the ASR set 300; contact 2 is coupled to contact 4 of the Distributor, contact 17 is coupled to contact 3 of the distributor; contact 19 is coupled to contact 2 of the distributor, and contact 22 is coupled to contact 1 of the distributor. The other terminals of each of the contacts 1–5 of the distributor are connected together and coupled to a source of negative potential through the transmitting relay 427. Continuing with relay 418, contact 7 is coupled through the magnet 428 to a source of negative potential, and through the Auxiliary contact A–429 to contact 1 of relay 366, and to contact 3 of a Blank Idle Relay (BIR) 430. Contact 4 is coupled to contact 5 of the transmitter of the ASR set 300, and through a diode 431 to a junction terminal 432; contact 1 is coupled to contact 4 of the transmitter and through a diode 433 to the junction 432; contact 16 is coupled to contact 3 of the transmitter and through a diode 434 to the junction 432; contact 18 is coupled to contact 2 of the transmitter and through a diode 435 to the junction 432, and contact 21 is coupled to contact 1 of the transmitter and through a diode 436 to the junction 432. The junction 432 is coupled through a diode 437 to contact 9 of relay 366 and through another diode 438 and an impedance 440 to a source of negative potential.

Contact 9 of relay 366 is also coupled to a source of negative potential through the winding of relay 366 coupled in shunt with an impedance 441 and in series with an impedance 442; and movable contact 4 of relay 366 is coupled to a ground terminal. Contact 10 of relay 418 is coupled to a source of negative potential through the winding of relay 418 coupled in shunt with an impedance 443 and in series with an impedance 444. A series network of a capacitor 444 and an impedance 445 is interposed between contact 7 of relay 418 and a ground terminal.

With reference to the Blank Idle Relay (BIR) 430, contact 2 is coupled selectively to ground terminal through a Blank Idle Push Button Switch 446; and contact 3 is coupled to the junction common between the impedance 440 and the diode 438 through the winding of relay 417 coupled in shunt with an impedance 447 and in series with a crystal diode 448 and an impedance 450. The winding of the relay 430 is coupled in shunt with an impedance 451 and in series with an impedance 452 this combination being interposed between ground terminal and a source of negative potential. A conductor interposed between the junction common to the impedances 451, 452 and the push button switch 446 to permit the winding to be shorted selectively. Contact 2 of relay 430 is coupled to push button switch 446 and is normally coupled to a ground terminal.

The Distributor magnet 453 in the ASR set 300 is interposed between a source of negative potential and contact 6 of relay 392. In relay 356, contact 2 is coupled to an A.C. ground terminal.

Referring now to the ASR set 300, contacts 316 and 330 are coupled to a ground terminal; and contact 326 is coupled to contact 328.

Contact 6 of relay 352 is coupled to a source of A.C. through a Print Case Solenoid 454 located in an RO teleprinter 386 used as a Billing Printer. A capacitor 456 is coupled in shunt with the Solenoid 454.

The Signal fed to the Selector magnet 342 located in the ASR set 300 is also fed to a Selector magnet 457 located in the RO Teleprinter 386.

*Description of Operation of Terminal Station Power on Condition.*—When power is first fed to the terminal station a Blank signal is fed to the line to enable the waystations to read for extended Rest Pulse signals. The winding of relay 203–(BSR) is coupled to a ground terminal through Deck D step 1 of the Invitation Switch 86 and through contacts 3 and 4 of relay 174 (POR). Energized relay 203, acting through its contacts 7, 8, operates relay 224 (TCC) which disconnects the transmitter from the distributor to prevent transmission of information from the tape; and with relay 203 energized the transmitter step magnet 211 is no longer coupled to a ground terminal and therefore, will not step. The distributor can now transmit information generated by the Invitation Switch 86. However, since there is no ground connection to the movable contacts or wipers of the Switch a Blank will be present on and transmitted from the Switch. Continuing, activation of relay 203 (BSR) initiates operation of the Distributor by coupling the Distributor step magnet to a ground terminal through contacts 3, 4. Thereafter Auxiliary Contact 207 closes and operates relays 205 (DST), 212 (DCC) and 208 (SIC). Relay 208 locks up to unoperated relay 152 (DCR–2). Ground through contacts 4, 5 of energized relay 208 operates relay 174 (POR) which locks up through its contacts 7, 8 to a ground terminal, and remains in an energized state until the power is turned off.

Upon completion of the transmission of the Blank from the Invitation Switch, the auxiliary contacts 207 open and relay 151 (DCR–1) coupled in series with relay 212 (DCC) operate; and relay 205 (DST) is released. When relay 151 (DCR–1) operates relay 203 (BSR) is released to stop the operation of the distributor and to release relay 224 (TCC). Release of relay 203 (BSR) urges release of relays 151 (DCR–1) and 212 (DCC). It is to be noted that relays 212 and 151 are "one-shot" operating relays, that is that they first operate to release relay 203 and then they assume an inoperative or release state. With relays 174 (POR) and 208 (SIC) oprative all other relays are not operative and the Invitation Switch is on Step 1.

*Waystation Transmitter, Invitation Cycle.*—The terminal station Invitation Switch 86 transmits a "W" signal, steps, receives request for an invitation from a waystation and sends a "Y" signal. Transmission of a Y signal does not require an answer back. Therefore, approximately 500 ms. after a Y signal is transmitted, the Invitation Swith sends the first invitation character. If the terminal station receives a "No" answer back—an "X" signal—to the first invitation character the Invitation Switch will step to the next position and send the next invitation character. However, the terminal station may receive a "Yes" answer back from the waystation indicated by the occurrence of an incoming message, a character other than "X" from the invited waystation. At the end of the message the Invitation Switch steps to its next position and generates the invitation character for the next invited waystation. If, however, the terminal station does not receive an end of message signal or receives an incorrect end of message signal then a "Y" signal will be generated to "alarm" the waystation of a malfunction and step the Invitation Switch to its next occurring step position.

After the occurrence of a 50 ms. extended Rest Pulse signal the Common contacts 131, 132 in the ASR Set 105 will close and with the Rest Pulse or Off Normal Contacts 133, 134 in the ASR set which have been closed previously, relay 95 (RPR) will operate and lock up through contacts 12, 13 of operated relay 208 (SIC) and contacts 4, 5 of relay 211 (DSC). When relay 95 (RPR) operates, ground through contacts 3, 4 of relay 154 (DCR–2), through contacts 1, 2 of relay 212 (DCC), through contacts 15, 16 of operated relay 95 (RPR), and through contacts 6, 7 of relay 208 (SIC) will operate the distributor magnet 267 and cause the distributor to cycle. Additionally, ground through contacts 4, 3 of relay 152 (DCR–2), contacts 17, 18 of relay 95 (RPR), contacts 4, 5 of unoperated relay 75 (RSR) contacts 12, 13 of unoperated relay 146 (SRR), and contacts 24, 25 of operated relay 208 (SIC) is applied to the movable contacts of decks E through J of the Invitation Switch (Step 1 of decks E through J of the Invitation Switch is wired for the "W" signal). With relay 95 (RPR) in its operative state the transmitter will not step. Relay 224 (TCC) operates through ground-contacts 6, 7 of relay 95 (RPR) to disconnect the transmitter from the distributor to permit the "W" signal to be sent from the Invitation Switch. With the distributor running, the auxiliary contacts 207 close and relays 205 (DST) and 212 (DCC) operate and prepare relay 152 (DCR-2) to operate. When relay 212 (DCC) operates ground through contacts 1, 2 is removed from the distributor—but the distributor continues to operate until it completes its cycle. Also, when relay 212 (DCC) operates ground from relay 95 (RPR) contacts 11, 12 is applied through relay 211 (DSC) contacts 1, 2, relay 212 (DCC) contacts 5, 6, and relay 208 (SIC) contacts 20, 21 to enable the step magnet 247 of the Invitation Switch to become energized. Removal of this ground from the step magnet 247 will step the Invitation Switch to its next step position. After the "W" signal is sent from the Invitation Switch the auxiliary contacts 207 open to operate relay 152 (DCR-2) coupled in series with relay 212 (DCC). When relay 152 (DCR-2) operates the hold up ground for relay 208 (SIC) is removed and relay 208 releases. When relay 208 releases the lock-up ground for relay 95 (through relay 208 to relay 211) is removed and relay 95 is released. When relay 95 releases ground from relay 95 is removed from relay 152 and relays 152 and 212 (which were operated in series) will both release. Now, it will be observed that all of the relays are released except relay 174. At the same instant that relay 208 released ground from relay 95 through relays 211, 212, and 208 was removed from the step magnet 247 of the Invitation Switch 86 and the Invitation Switch advances to step 2 and will remain there until a request for the initiation of an invitation cycle comes in from a waystation.

Now, if any waystation has a message to send it can request an invitation cycle at this time by transmitting an "X" signal. The Terminal Station is equipped with a common contact which closes whenever a character is received. In this manner positive indication is obtained even if more than one station sends an "X" signal at the same time and a jumbled character results. When a request is received by the Terminal station, ground from deck C step 2 of the Invitation Switch through the closed Common contacts 33, 34 of the RO Teleprinter 30 operates relay 208 (SIC) which locks up to relay 152 (DCR-2) in the same manner as indicated above. When relay 208 operates the distributor stops running and, also, ground from relay 211 (contacts 4, 5) through operated relay 208 (contacts 12, 13), unoperated relay 205 (contacts 1, 2), and operated relay 174 (contacts 9, 10) operate relay 95 (RPR) which locks up to the same ground through operated relay 208 (SIC). Then ground from deck A step 2 of the Invitation Switch through operated relay 208 (contacts 8, 9), unoperated relays 75 (contacts 15, 16) and 146 (contacts 1, 2), and operated relay 95 (contacts 19, 20) operates the relay 142 (RAC) which locks up to unoperative relay 57 (CRR) to start the timing cycle. The timing cycle is initiated even though no answer back is expected when the "Y" that is prewired on step 2 of the Invitation switch is sent out. The "Y" is sent out to instruct all waystations to stop sending in requests. With the relays 208 (SIC) and 95 (RPR) in the operative state, ground from relay 152 (DCR-2) will enable the distributor to operate and the transmitter will be disconnected from the distributor and will be prevented from stepping as relay 224 (TCC) is operated from relay 95 (RPR) similar to that which occurred when the "W" signal was transmitted. Then "Y" is sent in a manner similar to the way "W" was sent, and when auxiliary contacts 207 open all of the relays release except relays 174 (POR) and 142 (RAC), and the time delay network 144 for relay 73 (RAR) is operative. When the relay 208 (SIC) releases, the ground terminal is removed from the step magnet and the Invitation Switch advances to the next or third step which is wired for the first invitation character. After approximately 500 ms. the timing tube fires and relay 73 (RAR) operates. Ground from relay 73 (contacts 4, 5) is applied to the knock down winding of relay 142 and it releases, resetting the timing cycle. The same ground from relay 73 also operates relay 208 (SIC) through relay 66 (contacts 3, 4). When relay 208 operates, the distributor stops. After a 50 ms. extended Rest Pulse the Common contacts 131, 132 close and with the Rest Pulse or Normal contacts 133, 134 in a closed condition, ground through the Common and Rest Pulse contacts will operate relay 95 (RPR). It is here noted that the Rest Pulse contacts are closed only during a rest interval of the ASR set—during all other times these contacts are in an open condition. The distributor then runs and the transmitter can not step and is disconnected from the distributor as indicated previously. The first invitation character from step 3 of the Invitation Switch 86 is sent out, and at the completion of this cycle all relays except relay 174 (POR) are released—just as occurred when "W" and "Y" signals were sent out—and the Invitation Switch advances to step 4. If that station which is responsive to the first invitation character does not have any message to send then the waystation transmits an "X" which closes the "X" contacts in the RO Teleprinter and ground through the closed "X" contacts operates relay 208 (SIC) and the same sequence as indicated above occurs—the character wired on Step 4 will be sent and the Invitation Switch will advance to step 5.

If, however, the station whose call letters are wired on step 4 does have a message to transmit then it answers back by sending its message. The waystation start-of-message is Letter-Shift, Letter-Shift. The terminal station teleprinter reads for an other than "X" as the start-of-message. The Common contact closes for any character, and if the character is not an "X" then the "X" contacts will be closed and ground will go through the unoperated relay 55 (contacts 1, 2) to operate relay 57 (CRR). The Receive Connect Lamp (white) 67 lights to indicate that a message is being received. Relay 57 locks up through unoperative relays 66 (contacts 1, 2) and 146 (contacts 18, 19) to unoperative relay 208 (contacts 3, 4). Additionally, when relay 57 operates the Print Case Solenoid 74 in the RO Teleprinter 30 is energized through the contacts 7, 8, and unoperated relay 63 (contacts 3, 4), and the RO Teleprinter prints the message. At the end-of-message which is identified by the occurrence of a Blank and an extended Rest Pulse, ground will be coupled through the closed Blank and closed Rest Pulse contacts to operate relay 208. When relay 208 operates, the lock-up ground to relay 57 from relay 208 (contacts 3, 4) is removed and relay 57 releases. When relay 208 (SIC) operates the relay 95 (RPR) operates and the complete cycle is repeated and the character wired on step 5 of the Invitation Switch is sent out and the Invitation Switch advances to step 6. The Invitation Switch continues to advance to each next occurring step in this manner until it reurns to step 1 where the "W" is again transmitted to permit the waystation to initiate requests. The Invitation Switch will advance to step 2 and remain there until a request is initiated by one of the waystations, and then the invitation cycle will again function as described above. If, during the cycling sequence, a waystation responds with a message, relay 57 (CRR) operates as described above to activate relay 252 (CIC) through relay 57 (contacts 9, 10) to a ground on operated relay 174 (contacts 7, 8). With the relay 252 in its active state, the Invitation Switch does not send the "W" from step 1 or the "Y" from step 2; but proceeds to step 3 from where the invitation cycling is commenced. When the Invitation Switch advances to step 3, ground from relay 208 (contacts 4, 5) is applied through deck K step 3 to the knock down winding of relay 252 to release it. Thus, cycling will be continuous and the waystation initiate unlock signal "W" and initiate lockout signal "Y" will not be transmitted as long as one or more waystations responds with a message during each invitation coupling sequence. However, if none of the waystations have any messages to send then relay 252 (CIC) will not operate and the Invitation Switch will send the "W" from step 1 and then stop on step 2, to wait for a request for cycling.

The timing cycle that operates when the "Y" is sent out also operates each time an invitation character is sent out. Ground from deck A, steps 2 through 12 (depending on which invitation character is being sent) is coupled to operate relay 142 through operated relay 95 (contacts 19, 20), unoperated relay 146 (contacts 1, 2), unoperated relay 75 (contacts 15, 16), operated relay 208 (contacts 8, 9) and the Station Close-Out Switch. Relay 142 (RAC) then locks up to unoperated relay 57 (contacts 4, 5) and the timing cycle starts. If the "No" answer back comes back within 500 ms., ground through the "X" contacts (31, 32) of the RO Teleprinter 30 knocks down relay 142, which resets the timing cycle. This ground also operates relay 208 and the invitation cycle operation is then rpeated as described previously. If start-of-message which constitutes a "yes" answer back is received, relay 57 will operate and remove the lock-up ground from relay 142. Relay 142 will then release and the timing cycle will be reset. If, however, neither a "YES" or a "NO" answer back is received within 500 ms. the Time Delay Network 144 will fire to operate relay 73 and ground from relay 73 will be coupled to the knock down winding of relay 142 to release it—to reset the timing cycle. This same ground from relay 73 is also coupled to operate relay 208. Now, when the relay 208 operates the distributor stops and, after a 50 ms. extended Rest Pulse, the Common contact will close and with the Rest Pulse contact already closed the relay 95 will operate and the next invitation character will be sent out to the line in the same manner as described previously.

If, for any particular reason, a waystation is closed out, the station Close-Out Switch associated with that station will be moved manually to its closeout position. This switch is located at the terminal station. Thereafter, ground through the movable contact of deck A of the Invitation Switch will not operate relay 142 (RAC) but, instead, will ground relay 95 (RPR) so that it cannot operate to prevent the sending of that particular invitation character. Ground from the movable contact of deck B of the Invitation Switch will operate the step magnet through the interrupter springs and the Invitation Switch will advance itself to the next occurring step.

When the invitation cycle is initiated the terminal station must stop sending unless the terminal station is performing the selection process. When the terminal station stops sending a message it sends out an invitation character and then resumes sending. The request for an invitation operates relay 208 which stops the operation of the distributor. After a 50 ms. extended Rest Pulse the Common contacts close and, with the Rest Pulse contacts in a closed condition the relay 95 is energized and operates relay 224 and disconnects the transmitter from the distributor; and the invitation character is sent from the Invitation Switch. After the invitation character is sent and the auxiliary contacts 207 open, relays 152 and 212 become deenergized and knock down or deenergize relay 208 which, in turn, releases relay 95. However, the distributor continues to run (because relay 205 is slow to release) and transmission from the transmitter again occurs.

*Waystation Printer Selection.*—In this invention the message format (see FIG. 6) of a message outgoing from the terminal station to the waystation is as follows:

↓ ↓ ↡ ↟ H ⌜L(Q)DC↡<⇒ TEXT ↟H↓

It is to be understood, however, that this invention is not limited to this particular format and that the use of other formats is possible.

The Letters-Shifts preceding Figure-Shift, H (upper case H) are characters used to permit the preceding message to go through the transmitter to prevent the occurrence of undesirable tight-tape delays. The Figure-Shift, H, Letter-Shift is actually the end-of-message sequence to the previous message and instructs the connected remote station to form-feed and disconnect. This message ending sequence which will hereinafter be referred to as Figure-Shift, H, Letter-Shift, can be variable dependnig upon the requirements desired for the system. The "Figure-Shift, H," is read in the stunt box of the ASR Set monitor printer in the terminal station and enables the monitor printer to read certain designated characters and to provide outputs. The Figure-Shift, H, instructs the terminal station to stop the transmission of invitation characters since a printer selection process is about to start. The character "Q" which is optional, is read in the monitor printer and instructs the terminal station to expect an answer back. This "Q" instructs any remote station that is in the process of sending to the terminal station to stop. It also informs the remote station to answer back when selected. The next two characters, "D" and "C" (which are the selection call letters for the particular waystation in this example) select the remote station DC. The Line-Feed following these two characters instructs the selected remote station to send an answer back. This same Line Feed also instructs the terminal station to begin timing for the answer back. In the case of a non-Q message, the Carriage Return or the Line-Feed tells the terminal station to discontinue reading for selection codes and to restore the invitation cycle circuit. The terminal station will continue to send the message text. If the answer back is received in the allotted time, the Send Connect Lamp (Green) 281 lights and the terminal station Pauses for approximately 50 ms., sends R, continues to send the message, goes on to the next message, and repeats the switching process described above. If no answer back is received or a wrong answer back to the selection sequence occurs, then the terminal station will send an S which will disconnect the waystation, and the terminal station must then again send the message from the beginning.

*Selection Process.*—The Figure-Shift, H in the message format instructs the terminal station to stop the transmission of invitation cycling characters. The stunt box of the monitor printer at the teminal station monitors what is being sent to the line and, when it reads Figure-Shift, H, the Message Ending Contacts 112, 113, 114 in 105 operate relay 77 which locks up through the unoperated Line Feed contacts 119, 118 and Carriage Return contacts 116, 117. When relay 77 operates, the Time Delay Network 185 starts to operate. When Figure-Shift, H is read relay 78 operates from ground through the Message Ending (advance) contacts 110, 111. If there is no message to be sent the Time Network 185 will fire after three seconds to operate relay 100 which locks up to ground on operated relay 77 (contacts 6, 7). When relay 100 is energized it operates relay 68 and couples ground through contacts of relay 68 to operate relay 146. When relay 146 operates, relay 78 releases to enable relay 95 to be operated. Relay 146 also opens the operate circuit for the distributor clutch and the distributor stops. Operation of relay 146 permits ground to be coupled to intelligence pulse contacts 1 and 3 of the distributor to prime the distributor for the character "S." After approximately 50 milliseconds relay 95 operates from ground coupled through the common contacts 131, 132 and Off-Normal contacts 133, 134 of the stunt box. Energization of relay 95 disconnects the transmitter from the distributor and the distributor operates once to send the "S" character to the waystations. It is this "S" character which instructs the waystations that there will not be any printer selection calls after this Figure-Shift, H, but instead the terminal Station will start transmitter invitation cycling again. Invitation cycling can commence, however, the transmitter will not run until the "No Answer Alarm Release" button 90 is depressed to release relays 100, 68, and 146. During this procedure the "No Answer" Lamp 92 will be energized, however, this is only an indication that the transmitter has been stopped.

This timer procedure just described will occur only when the sending operator has punched a multiple number of characters (usually Letters-Shifts) after a Message Ending in order to clear the last message over the pins of the transmitter while he is preparing more tape for transmission. Normally, mesages will be transmitted continuously with no delay and the Time Delay Network will not fire.

Start-of-Message as well as End-of-Message is Figure-Shift, H, Letters-Shift and when Figure-Shift, H is read ground from the operated Message Ending Contacts 125, 126 resets the timer and it again begins the timing cycle. Relay 77 remains operated because Line-Feed or Carriage Return have not been read. Relay 78 also remains operated.

As long as relay 75 remains energized the distributor will run whether or not relay 208 is energized. Invitation characters can not be sent during this interval. No interruption in transmission should occur during the printer selection process (relay 78 being in an energized state) except for alarm condition or tape-out or tight-tape condition.

Let's assume, for example, that a message is to be sent before 5 seconds elapse—a normal fact situation. When relay 78 operates, it locks up to both unoperated relay 78 (contacts 1, 2) and to unoperated relay 146 (contacts 3, 4) through unoperated relay 75 (contacts 1, 2) so that the distributor will continue to operate even if relay 208 becomes energized. In this instance not even will a request for invitation stop the distributor and the invitation cycle will not operate. Relay 95 is shorted and, therefore, can not operate when relay 78 is operated. Thus, even if the distributor did stop operating, the relay 95 would not operate and an invitation character would not be sent. Relay 78 can be knocked down when relay 146 or relay 75 operates or when the Line-Feed following the selection sequence is read for a non-Q message.

*Selection Answer Back Required.*—For a "Q" message (an answer back is required) the terminal station can send to only one waystation at a time. When Q is read, relay 138 operates and locks up to ground through relay 77 (contacts 6, 7), and the Line-Feed connection is transferred from the relay 78 knock down winding to the operate winding of relay 63. The call letters are sent followed by a throw-away character (Letter-Shift). This throw-away character is inserted so that more time is allowed between "Q" (which instructs the sending waystation to stop sending) and Line-Feed (which instructs the selected waystation to send the answer back). This is to insure that the furthest station on the line will read the "Q" and stop transmitting before the selected station answers back. Upon receipt of the "Q" any waystation that is sending a message will stop to prevent interference with the answer back from the selected station. Carriage Return is then read which instructs the waystation to return the carriage. When the Line-Feed signal is received the relay 63 operates and locks up directly to ground, and relay 77 releases. However, relay 138 does not release even though its lock-up from operated relay 77 is removed; it remains operated by locking up through the make contact 120 of the Line-Feed contacts in the stunt box 105.

When relay 63 operates it opens the circuit from deck C step 2 of the Invitation Switch through the Common contacts 31, 32 in the RO teleprinter to prevent the operation of relay 208 if the answer back (X) comes from the selected station. The circuit is opened since the answer back (X) for the selection sequence is the same as that for the invitation cycle and relay 208 must be prevented from operating if the Invitation Switch is at its step 2 position.

Relay 63 opens the Print Case Solenoid 74 in the RO teleprinter in the terminal station. In this manner the "X" answer back from a selected station will not be printed as part of an incoming message.

The ground through contact "X"—31, 32 is now transferred to the operate winding of relay 75 to enable relay 75 to operate when the answer back is received (which will occur a few characters after Line-Feed). The operation of the relay 75 indicates that the connection to the selected waystation has been made.

After Line-Feed is read, relay 138 releases because its lock-up through the Line-Feed contact 120 is removed. The answer back to the selection sequence operates relay 75, which operates relay 156 through its contacts 7, 18 which in turn energizes the Send Connect lamp (Green) 281. Additionally, activation of relay 75 releases relay 78 and the distributor will stop. Release of relay 78 permits the invitation cycle to again resume. After a 50 ms. extended Rest Pulse the common contact will close and, with the Rest Pulse contacts in a closed position, the relay 95 will operate and the distributor will start operation. However, the transmitter cannot step and is disconnected from the distributor. Now, ground from relay 152 (contacts 3, 4) is coupled through energized relays 95 (contacts 17, 18) and 75 (contacts 5, 6) to the number 2 and 4 intelligence leads of the transmitter to provide for the transmission of an "R" signal. When this "R" signal is read by the ASR set monitor printer at the terminal station the relay 63 is knocked down through the closing of the "R" contacts 123, 124, the message goes out to the line, and the terminal station is in a ready condition for another message.

*Selection Answer Back Not Required.*—For a non-Q message, one in which no answer back to a selection is required the terminal station can send to any number of waystations at one time by merely sending the selection codes of the various stations to be selected. When Figure-Shift, H, Letter-Shift is sensed by the stunt box of the ASR monitor printer at the terminal station, the relays 77 and 78 operate and lock up in the same manner as described previously for Q messages. When relay 78 operates the invitation cycle is stopped and will not begin operation until Line-Feed is read in the monitor printer. However, since an answer back is not required any waystation which is sending at this instant can continue to send. The selection characters are then sent followed by Letter-Shift, Carriage Return and Line-Feed. When Line-Feed is sensed by the ASR monitor printer at the terminal station relays 77 and 78 release as their lock up ground through the Line-Feed contacts 118, 119, 120, and 108, 109 are removed. Release of relay 78 permits the invitation cycle to again resume. The operation of the timing cycle here is the same as the timing cycle for a Q message.

As indicated above, relay 75 is activated when the "X" answer back to the selection sequence for a "Q" message is received and operates relay 156. However, for a non-"Q" message the relay 156 operates when the Line-Feed signal following the selection sequence is detected. In either instance the relay 156 locks up through the contacts 112, 113 in the stunt box 105 of the ASR set and remains in its operative state maintaining the Send Connect Lamp 281 in an energized state until Figure-Shift, H, is read at the End of Message.

*Time Swich.*—The Time Switch 148 is used to insert the time of transmission of the message from the terminal station. If the time of the message being sent is required the throw-away character, Letter-Shift, in the selection sequence occurring after the last printer selection call is replaced by the character Space. When Space is read after Figure-Shift, H, Letter-Shift, Q (selectively included), and the last printer selection characters (DC in this instance) relay 258 operates from ground through operated relay 77 (contacts 6, 7) and the closed Space contact 135, 136, in the stunt box 105. Relay 258 locks up to ground through deck A step 1 of the Time Switch. Transmitter auxiliary contacts 260 close during the transmission of Carriage Return. Then, ground through auxiliary contact 260 and operated relay 258 (contacts 2, 3) and through deck C step 1 of the Time Switch 148 steps the Time Switch to step 2, and the lock-up ground for relay 258 is removed and the relay 258 is released. When the Time Switch 148 advances to step 2 the transmitter is disconnected from the distributor and is prevented from stepping by the removal of the ground from auxiliary contact 207 through deck D step 1 of the Time Switch 148. Step 2 is coupled to generate a Line-Feed signal so that if the Line-Feed signal from the tape is not transmitted for some reason such as the occurrence of a tight-tape condition after the transmission of Carriage Return—then the Line-Feed from the Time Switch will be sent. Now ground from relay 146 (contacts 20, 22) through unoperated relays 75 (contacts 19, 20), and relay 208 (contacts 16, 17) through deck B step 2 of the Time Switch 148 will energize the Distributor Magnet, the distributor will run and the Line-Feed will be sent. When the Auxiliary contacts 207 close ground through contacts 207 and deck D step 2 of the Time Switch will advance the Switch to step 3 which is wired for Figure-Shift since the time of transmission is indicated in number form. The same ground from the relay 146 (contacts 20, 22) through the unoperated relays 75 and 208 and through deck B step 3 of the Time Switch will run the distributor, and Figure-Shift will be sent. When auxiliary contacts 207 close the ground coupled through auxiliary contact 207 and deck D step 3 of the Time Switch will advance the Switch to step 4. The Time Switch will remain on step 4 until a start ground connection from the Clock unit through the unoperated relay 224 (contacts 11, 12) and deck C step 4 of the Time Switch advances the Switch to step 5 which is wired for the generation of a Blank Signal. Ground from relay 146 through deck B step 5 of the Time Switch will cause the distributor to operate. Ground through deck A step 5 of the Time Switch will inform the Clock unit that the connection has been made. After the Blank signal from step 5 of the Time Switch has been sent auxiliary contacts 207 will close and ground coupled through auxiliary contacts 207 and deck D step 5 of the Time Switch will advance the Time Switch to step 6. Now, whatever information is on the decks E–J from the Clock unit will be transmitted in the mnaner just described. Letter-Shift is sent from step 10 because the next occurring character that will be sent will be either "A" or "P"—it will not be a number. Carriage Return and Line-Feed are then transmitted from steps 12 and 13. When the Switch is advanced to step 12, ground from the movable contact of deck A is removed from the Clock unit informing it that time information has been sent. When the Time Switch advances to step 14 the ground from the movable contact of deck A is coupled to and operates relay 203 which couples the transmitter to the distributor and also couples the transmitter clutch magnet to the auxiliary contact 207 to permit the transmitter to resume transmission of the message. When relay 203 operates, the ground coupled through the operated relay 203 (contacts 13, 14), and through the movable contact of deck C of the Time Switch will self-step the Time Switch until the switch arrives at step 26. On step 26 the ground from the movable contact of deck A is coupled to the step magnet 268 and the Time Switch advances to step 1. Additionally, ground is removed from relay 203 and it releases, however, the transmitter remains connected to the distributor through the number 1 step contacts of the Time Switch.

*Print Case Relay Control.*—The ASR monitor printer located at the terminal station is in print case when relay 93 is operative, and the printer will record information that is sent to the line. The printer is in its non-print case and will not print what is going out to the line when the relay 93 is in its released state. Now, if a message is sent by the terminal station 50 ms. after the first character—which would be Figure-Shift—has been sent the common contacts 129, 130 in the stunt box of the ASR monitor printer close and ground through the break contact of the Message Ending contracts through unoperative relay 95 (contacts 3, 4) cooperate to operate relay 93 which locks up directly to the same ground. Relay 93 remains in an operative state and everything is printed. However, if the distributor should be stopped for any reason (i.e., to send an invitation character or a Y or R or S or Blank signal) the common contacts 131, 132 will close 50 ms. later and, with the Rest Pulse contacts 133, 134 in a closed condition the relay 95 will operate. Each time that relay 95 operates both the operate and lock up grounds for relay 93 are opened and relay 93 releases; and the printer is urged to its non-print case and will not print the next occurring character. After the control character has been transmitted the relay 95 releases and the closing of the common contacts caused by the occurrence of this control character cause relay 93 to operate and the printer again urged to its print case.

*Function of the relay 211 (Distributor Send Control Relay).*—Relays 208 and 75 can each be operative simultaneously and, to assign priority to one, the relay 211 is provided. One of the functions of the relay 208 is to mark the Invitation Switch steps to permit the assigned waystation transmitter invitation character to be sent. Also, one of the functions of the relay 75 is to mark the number 2 and 4 intelligence pulse leads of the distributor so that an "R" signal can be sent. If an answer back to an invitation request is received just prior to the transmission of a "Q" the answer back must be stored so that the invitation cycle can be resumed after the waystation printer selection sequence is completed. The received answer back operates relay 208 which locks up to unoperated relay 152. However, since the terminal station is in the process of sending the printer selection sequence, the distributor will not stop because relay 78 is operative and, therefore, no invitation characters will be sent. Relay 78 will not release until either relay 75 or relay 146 operates. If the answer back to the selection sequence is received relay 75 will operate and lock up to relay 152, and this will release relay 78 and stop the operation of the distributor. At this instant each of the relays 208 and 75 are in their operative state. If no answer back or a wrong answer back is received relay 146 will operate when the Time Delay Network 88 fires and operates relay 68. Now, at this instant the condition exists where both relays 208 and 146 are operative.

In that instance where relays 208 and 75 are each operative simultaneously, relay 75 has priority and will send the "R" signal first and, after the "R" signal has been sent relay 208 will send the next invitation character from the Invitation Switch. With relays 208 and 75 each in an operative state, relay 211 will operate. With relay 75 operative the numbers 2 and 4 intelligence pulse leads of the distributor are coupled to ground and the "R" signal will go out to the line. Also, the five movable contacts E, F, G, H, and J of the Invitation Switch are not grounded because relay 75 is operative. After the "R" signal is sent relay 152 operates in the manner described previously (refer to that part of this description which relates to the invitation cycle) and removes the lock-up ground from relays 75 and 208. Relay 75 releases and through the contacts 8, 17 removes the operate ground from the relay 211. Relay 211 is slow to release and, therefore, will lock up to operated relay 152 (contacts 13, 14). Thus, relay 208 remains locked up to operated relay 211. Then relay 152 releases as described in the description of the invitation cycle and starts to release relay 211. However, since relay 211 is slow to release the lock-up ground to relay 208 from relay 152 will occur before the lock-up ground from relay 211 is removed. Then 50 ms. after the distributor stops the relay 95 operates and the next occurring invitation character is sent out.

In the instance where relays 208 and 146 are each operated simultaneously the same procedure just described occurs. However, in this instance relay 146 has priority and transmits the "S" signal first.

It is also possible that relays 146 and 75 will each be operated simultaneously. Relay 211 will operate if both of the relays 146 and 75 are operative. Relay 146 operates if transmission from a waystation to the RO teleprinter stops for a time duration of 7 seconds or if a wrong end-of-message is read—i.e., the RO teleprinter may read Blank not followed by an extended Rest Pulse which means that the waystation sent end-of-message followed by another message. As indicated previously, relay 146 may also operate during the printer selection cycle. Relay 75 will operate when the answer back to the selective sequence is received and will then lock-up to relay 152. Relay 146 will operate if there is no end-of-message or if there is a wrong end-of-message for an incoming message. Once again relay 75 will have priority of operation. When the distributor stops and relay 95 operates, ground from relay 152 coupled through operated relay 75 will ground the number 2 and 4 intelligence pulse leads of the distributor and an "R" signal will be sent. When relay 152 operates, relay 75 will release but relay 146 will remain locked up to operated relay 211 as well as to operate relay 152 and, therefore, it will not release. Once again when relay 152 releases it will replace the lock-up to relay 146 before the relay 211 releases to maintain the relay 146 operative and a "Y" signal will be sent out.

*Tight-Tape Circuit.*—The tight-tape circuit consists of a tape-out contact, a tape arm contact, a timer network, and a relay 147. If a legitimate auto-stop occurs (i.e., the tape-out contact on the tape arm contact operates when relay 205 is operated), the timer network is activated and operates relay 147. If the auto-stop condition is removed the distributor will not operate because relay 147 is operative. When relay 205 releases relay 147 releases and, because relay 205 is released the distributor will not be able to run. However, the release of relay 205 while relay 174 is operated, permits relay 203 to operate. Operation of relay 203 sends a Blank signal as described in the beginning of this description of the operation of this invention. Once the distributor has sent a Blank and has operated relay 205, it will continue to run and will send the message punched on the tape. Thus, for any legitimate auto-stop condition that has a duration sufficient to permit the timer network to fire—the circuit will wait for the release time of the relay 205 and then send a Blank signal when the auto-stop condition is removed. The character Blank performs no other control function other than to place a selected waystation in its print mode of operation.

This circuit also controls the start of traffic when tape is placed in the transmitter. Before the transmitter can start, if relay 205 is released, relay 203 will operate to send a Blank signal. When the Blank signal is sent the auxiliary contacts 207 close to operate relay 205, and the transmitter then operates and traffic goes out to the line. The character Blank is sent as a throw-away character preceding message transmission so that the first character of a message will not be interpreted by waystations as a control character.

*Selection Answer Back Alarms.*—The following alarm conditions can occur during the selection sequence for a "Q" message: there can be no answer back; or there can be a wrong answer back (a character other than "X" which would signify that a waystation that was sending prior to the selection sequence did not stop sending when it received the "Q" signal from the terminal station). For the non-Q message no answer back is expected and, therefore, an alarm condition is not required.

*No Answer Back.*—When the Line-Feed is sent to instruct the selected station to answer back the relay 63 operates and activates the Time Delay Network 88. If an answer back is not received within approximately 1.5 sec. the network operates relay 68 and energizes the No Answer Lamp 92. When relay 68 operates ground from operated relay 78 through operated relays 63 and 68 operates relay 146 which locks up to unoperated relay 152. Also, when relay 68 operates ground is removed from the distributor and the distributor stops. When relay 146 operates the lock-up ground from operated relay 146 through unoperated relay 75 is removed from relay 78 and relay 78 releases to permit the invitation cycle to begin. Release of relay 78 removes the ground from relay 146 which is held up by the lock-up ground from relay 152. After a 50 ms. extended Rest Pulse the Common contact closes and, with the Rest Pulse contact already closed, relay 95 operates to prevent the transmitter from stepping and disconnects the transmitter from the distributor and initiates operation of the distributor. Relay 63 is in an operative state (it does not release unless an answer back is received) and ground from unoperated relay 152 through operated relay 95, unoperated relay 75, and operated relay 146 is coupled to the number 1 and 3 intelligence pulse leads of the distributor and an "S" signal is transmitted. When the selected way station reads this extended Rest Pulse "S," it will disconnect. The tape will then have to be reset manually to start of message and the No Answer Alarm Release button 90 depressed to permit the message to be sent again. When the "S" is read in the ASR monitor printer the Stunt Box ground through the closed "S" contact will knock down relay 63 which then releases relay 146 due to the operation of relay 152 and the network has now assumed the same condition as had existed before the message was sent.

*Wrong Answer Back.*—If a wrong answer back comes in—any signal other than an X, then ground through the Common contacts 45, 46 and "X" contacts 43, 44 in the RO teleprinter acting through operated relay 63 will operate relay 68 which then operates relay 146 and sends an "S" signal as it did in the no answer back instance described previously; and the circuit then functions in the same manner as it did when there was no answer back.

*Receiving Transmission Tie-up.*—Another alarm condition exists when two consecutive receiving transmission tie-ups occur while the terminal station is receiving incoming traffic. When the terminal station is receiving information relay 57 is energized and locked up to de-energized relay 208. If the end-of-message (Blank) is read in the RO printer, relay 208 operates and relay 57 releases. If no end-of-mesage is read in the RO printer and no characters are being received the circuit will start its timing operation. After 7 seconds the Time Delay Network will energize relay 55 through unoperated relay 73. Ground from relay 57 through energized relay 55 and deenergized relay 60 will energize relay 146 which will lock up to relay 152. Energized relay 146 also stops the operation of the distributor and releases relay 57 by removing the lock-up ground from relay 208. When the relay 57 releases the ground from the released relay 57 through energized relay 55 operates relay 60 which locks-up through the Tie-up Release push button 73 to ground. After a 50 ms. extended Rest Pulse the Common contacts close and, with the Rest Pulse contact in a closed state, relay 95 operates to start the distributor, disconnect the transmitter from the distributor, and prevent the transmitter from stepping. Then ground from the relaxed relay 152 is coupled to the number 3 intelligence pulse lead through energized relay 95, relaxed relay 75, and energized relay 146. This same ground is also coupled to the numbers 1 and 5 intelligence pulse leads through relaxed relay 63—and a "Y" signal is sent. Also, when relay 95 is energized ground from relaxed relay 68 coupled through energized relays 146 and 95 operates relay 142 and starts operation of the 500 ms. Time Delay Network 144. Relay 142 locks up to relaxed relay 57 through relaxed relay 73. The "Y" signal is sent out to inform the way stations that they should disconnect and, after 500 ms. the Network 144 fires and energizes relay 73. When relay 73 operates the 7 second Time Delay Network is reset, relay 208 operates and relay 142 assumes it relaxed state because its lock-up ground is removed. The 500 ms. Network is reset, relay 55 releases and the next occurring invitation character is sent out. However, at this instant relay 60 is still locked-up to ground through the Tie-Up Release push button. In this manner the information that there has been a (one) Rec. Transmission Tie-Up is stored. If an end-of-message is received when the next message is received the Blank contacts 35, 36 close and ground through these closed Blank contacts will knock down relay 60. However, if the end-of-message is not read the 7 second Time Network starts to operate and, after 7 seconds energizes relay 55. Ground from energized relay 57 through energized relay 55 and energized relay 60 lights the Receive Transmission Tie-Up lamp 70. This time the "Y" signal will not be sent out because the energization of relay 60 prevents the energization of relay 146. The invitation cycle will not continue and messages will not be received until the Tie-Up Release button 73 coupled to relay 60 is depressed to release relay 60. When ground from the energized relay 57 through operated relay 55 and relaxed relay 60 will operate relay 146, and the "Y" signal will be sent as before. The remainder of the operation is similar ot the first receiving transmission tie-up condition.

*Wrong End-of-Transmission.*—Another alarm condition arises when wrong end p-f-transmission occurs, that is, a Blank signal followed by more characters (constituting another message). Relay 146 will be energized through the operated Blank contacts and unoperated Rest Pulse contacts in the RO teleprinter and a "Y" signal will be sent as described above to alarm the waystations. However, no alarm indication will occur at the terminal station.

*Detailed Description of Operation of Waystation Print Case Relay Control.*—When any Stunt Box control character which is designated in the figures as Advance contacts—contacts 301, 302; 308, 310; 311, 312; 313, 314; 335, 336; and 340, 341; is sent from the Terminal Station it is preceded by a character and an extended Rest Pulse (Pause). These Signals close first the Off-Normal contacts and then the Common contacts. Ground from relaxed relay 342 (contacts 1, 2) is then coupled through these contacts (303, 304; 306, 307) to energize relays 345 which then locks-up to ground on relay 342 coupled in series with relay 343 after the Common contacts open. This lock-up path is active when either the Off-Normal or the Common contacts open. Energization of relay 345 acting through contacts 5, 6 and relay 342 (contacts 1, 2) operates relay 343. The Common contacts will open first unless there is a false character on the line which will then cause the Off-Normal contacts to open. In this instance the same ground will go through unoperated or relaxed relay 343 to maintain relay 345 energized or operated. Whenever relay 345 operates relay 356 will release. The operate path for relay 356 is from ground on relay 345 (contacts 1, 2) through either relay 346 (contacts 4, 5) or relays 352 (contacts 4, 5) determined by the relay which is in its operate state. The printer is now in its non-print case. Ground from operated relay 343 (contacts 5, 6) is coupled to the bus bar common to a contact of each pair of contacts for the control characters. Now, the control character is sent. Control characters can be trasmitted sequentially if they are separated by a Pause. If, however, a control character is followed immediately by a message character then the Common contacts and the Off Normal contacts will couple ground from relay 342 to relay 376, and relay 376 will operate and lock-up directly to ground. The relays 343 and 345 will release and urge relay 376 to release by grounding its battery. When relay 345 releases relay 356 operates and the next character is printed. It should be noted that the "advance" control contacts will close approximately one intelligence pulse length before the Common contacts close and performs its function before the Common contact releases the relays that provide the ground for the control contacts.

*Request to Send to Terminal Station.*—The message tape is prepared in the proper format. The message is preceded by Blanks, and two Letters Shifts and ends with a Blank. The tape is placed in the transmitter-distributor. The Blanks at the beginning of the message are stepped through the transmitter automatically. If this does not occur the Blank Idle push button 446 must be depressed to start idling of Blanks. Ground from the push button will short out relay 430, but it is slow to release and another ground on the push button will pass through contacts 2, 3 of relay 430 which are still closed and the transmitter clutch will operate and step the tape. The remainder of the Blanks will then automatically step through the transmitter. The first Not Blank character that is read will stop the operation of the transmitter by operating relay 366. The operator then depresses the Request push button 372 which operates relay 367 from ground through the tape Out contacts 315, Tight Tape contacts 314, released relay 373 and the Request push button. Relay 367 locks up to the same ground and the Request lamp 375 lights from ground on relay 367 (contacts 4, 5). Relay 418 operates from ground on operated relay 391 through unoperated relay 347, operated relay 367, and operated relay 366. It is here indicated that relay 391 will not be energized if the invitation cycle has begun and is in progress. Relay 418 locks up to ground on the relaxed relay 419. The contacts on the relay 418 code the distributor contacts to indicate the character "X." Ground from operated relay 418 is coupled through relaxed relay 393 to operate the distributor clutch. The character "X" is transmitted to the terminal station where it is recognized as a "request for invitation cycle" signal. The Auxiliary contacts 426 close and pass ground through operated relay 418 to operate relay 393 which interrupts the operate path of the distributor clutch. When this ground contact is removed the relay 393 locks up to ground coupled in series with relay 419 which now operates. The lock-up path for relay 418 is now removed and its releases. Ground from relay 418 shorts out the windings of relays 393 and 419 and they each release.

*Invitation Cycle.*—When the terminal station receives the "request for invitation cycle" ("X") it Pauses and sends a "Y." The previous character from the terminal station causes the Common contacts at each waystation to close. The Pause which is an extended Rest Pulse causes the Off Normal contacts to close. This results in coupling ground to the control character bus bar as indicated previously. The "Y" character closes the "Advance" Y contacts 313, 314 of the Stunt Box 300. Ground from the bus bar is coupled through the Y contacts, unoperated relay 392 and the release winding of relay 391 to urge relay 391 to release. The relay 391 in each waystation is released to prevent any other waystation from requesting an invitation cycle. The terminal Station now proceeds to invite each waystation sequentially. If it is assumed that the invitation call letter for the first waystation is A, then the terminal station will transmit Pause, A. The closure of the Common contacts from the previous character and the Pause couples ground to the control character bus bar as indicated previously. The A will close the Invite contacts 340, 341 in the Stunt Box of the first waystation. If this waystation has a message ready to transmit and the Request button has been depressed, ground from the bus bar in the Stunt Box coupled through the Invite contacts, operated relays 367 and 366 to operate relay 392. Relay 392 couples the Distributor Clutch to ground through the Tape Out contacts, Tight Tape contacts, unoperated relay 373, unoperated relay 347, and operated relay 392, and the message is then transmitted to the terminal Station. The Blank at the end of the transmission removes the ground that was shorting the winding of relay 417, and relay 417 operates when the Auxiliary contacts 429 close during transmission of the Blank. Blank is transmitted to the terminal station. The lock-up ground for relay 366 from relay 417 is removed and relay 366 releases. Ground from relay 366 shorts the relay 392 and it releases breaking the operate path for the Distributor Clutch. The Distributor stops. The relay 367 remains energized until there is a Tight Tape or Tape Out condition. In this manner a Request will automatically be stored for the next unit of work.

The terminal station will send a "Y" if no End-of-Transmission or wrong End-of-Transmission is received at the terminal station. This "Y" signal will couple ground through operated relay 392 to operate relay 373 which locks-up to ground through the Release Alarm push button 414 and the Send Alarm lamp 415 lights. The lock-up path for the relay 373 is through a preliminary make contact which insures that relay 373 is locked up before the relay 392 is released. Now operation of relay 373 interrupts the lock-up ground circuits of the relays 392 and 367, and they each release. When the relay 392 releases the distributor stops and the waystation stops sending. The tape must be reset manually to the start of the message; the Release Alarm button must be pushed to release relay 373; and the Request button must be pushed again to request an Invitation cycle.

If the waystation does not have a Request stored and the terminal station transmits its Invite character, ground from the bus bar is coupled through the Invite contacts and unoperated relay 367 to operate the relay 418 which locks-up to unoperated relay 419. Ground from relay 418 is coupled through unoperated relay 393 to operate the distributor clutch and the distributor sends the character "X" which is coded on the contacts of the relay 148. This "X" signal is the "NO" answer back to the terminal station. The Auxiliary contacts 426 close and ground is coupled through operated relay 418 to operate relay 393 which breaks the operate path for the distributor clutch. When the Auxiliary contacts 426 open the relay 393 locks up to ground and through the winding of relay 419 causing it to operate. When relay 419 operates it releases relay 418 which in turn releases relays 393 and 419. If the Request button 372 has been depressed and a message was not ready for transmission, the relay 366 would have been in its relaxed state and the Invite ground would have then been coupled through the Invite contacts, operated relay 367, unoperated relay 366 to operate the relay 418; and the same procedure as described immediately above would then occur.

*Receiving a "Q" Message.*—If the terminal station transmits a message which requires an answer back from the waystation, the message begins with Figs. H, Ltrs., Q. The Upper case H activates the Message Ending function mechanism contacts 315, 316, 317, 318 of the Stunt Box 300. This operates relay 358 which locks up to ground through the Line Feed contacts 325, 326 and Carriage Return contacts 328, 330 in the Stunt Box. When Q is read contacts 331, 332 close and couple ground from operated relay 358 through to and operates the relay 347 in each station. The relay 347 locks-up directly to ground and operated relay 347 prepares another lock-up path for relay 358. Any waystation transmitter that is sending to the terminal station will be stopped because the operation of the relay 347 breaks the operate path for the distributor. The terminal station then sends the Printer Call characters. Ground from relay 358 is coupled through the Printer Call contacts 321, 322; or 337, 338 the contacts chosen being determined by the printer that is to be selected, and then through the Form Out Indicator contacts 319, 320 to operate relay 346 or 352 which locks-up to Upper Case H contacts 316, 315. Ground from unoperated relay 345 is coupled through relay 346 (or 352) to operate relay 356. Now, AC ground 329 in the ASR set is coupled through relay 356 and relay 346 (or relay 352) to operate the Print Case Solenoid of the printer that was selected and the printer is now in Print Case. The terminal station continues to transmit the text of the message. The first line Feed in the text of the message operates the contacts 325, 326, 327 to couple ground through operated relay 346 (or relay 352), operated relay 347, and operated relay 358 to operate relay 418. Ground from relay 418 operates the Distributor Clutch and the distributor sends the Selection Answer Back character "X" which is coupled to its contacts from the contacts of relay 418. The Auxiliary contacts 426 close and the sequence of operation described in the next preceding paragraph is repeated. Relay 358 releases when the relay 393 operates during the "answer back." The terminal station Pauses on receipt of the Selection Answer Back and sends Character R. The "Advance" Character R contacts 335, 336 close and couples a ground to the knock-down winding of relay 347 and it releases. The operate path for the Distributor is restored and transmission by the waystation that was transmitting to the terminal station is resumed. The terminal station restarts transmission of the message to the selected waystation immediately following the Character R, and will end its message to the waystation with Figs. H Ltrs. which operates the Message Ending function contacts 315, 316, 317. Relay 346 (or relay 352) releases, relay 356 releases, the Print Case Solenoid releases and the selected printer returns to non-print case to wait for another selection.

If the terminal station did not receive the "X" Selection Answer Back, or received a wrong answer back, it will send an "S" signal. This "S" signal operates relay 353 at the waystation which disconnects the waystation by releasing the relays 346 (or 352), 358, and 347. The terminal station will then return the tape to the beginning of the message and again transmit the message.

*Receiving a Non-Q Message.*—The reception of a non-Q message is the same as for a Q message except that the relay 347 does not operate. Therefore, any waystation that is in the process of sending when the selection sequence was initiated will continue to send without interruption. An answer back is not required at the terminal station for non-Q messages and, therefore, when Line-Feed or Carriage Return—the alternate cut-off character—is read at the waystation the lock-up ground for relay 358 is removed and it releases. Since an answer back is not required to be sent to the terminal station, the Character "R" signal will not be received at the waystation.

The terminal station can send to all stations at once by sending the selection sequence "AAA" and this will operate the relay 346 in all of the waystations. Relay 356 will then operate to energize the Print Case solenoid of all message printers and all message printers will receive the message.

Obviously many modifications and variations of the present invention are possible in the light of the above teachings. It is therefore to be understood that within the scope of the appended claims the invention may be practical otherwise than as specifically described. What is claimed is:

1. A system for the transmission of control and message characters between a first station and a second station comprising a signal transmitting means at said first station, first means coupled to said signal transmitting means to stop the transmission of characters for a predetermined interval greater than the normal interval of time occurring between message characteristics and less than the duration of a single character to mark the commencement of control characters, a recording means at said second station fed by said signal transmitting means, and second means coupled to said signal transmitting means and to said recording means activated by the predetermined interval stop in transmission of signals to prevent the recording of received control characters.

2. A system for the transmission of the control and meassage characters between a first station and a second station comprising a signal transmitting means at said first station, first contacts driven to a first state by said signal transmitting means at the absence of a message character, second contacts driven to a first state by said signal transmitting means at the termination of a message character, first means coupled to delay the operation of said second contacts, synchronized operation of said first and second contacts marking commencement of control characters, second means coupled to said first and second contacts to stop the transmission of message characters for a predetermined interval after the occurrence of an interruption of transmission of message characters, a recording means at said second station fed by said signal transmitting means, third contacts at said second station driven to a first state at the absence of a message character fed to said recording means, fourth contacts at said second station driven to a first state at the termination of a message character fed to said recording means, third means coupled to delay the operation of said fourth contacts, and fourth means coupled to said third and fourth contacts to prevent the recording of received control characters and to permit the recording of received message characters.

3. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to delay the operation of said second contacts, synchronized operation of said first and second contacts marking commencement of control characters, first means coupled to said first and second contacts to stop the transmission of message characters for a predetermined interval after the occurrence of an interruption of transmission of message characters, a recording means at said second station fed by said signal transmitting means, third contacts at said second station driven to a first state at the absence of a message character transmitted to said recording means, fourth contacts at said second station driven to a first state at the termination of a message character transmitted to said recording means, second mechanical time delay means coupled to delay the operation of said fourth contacts, synchronized operation of said third and fourth contacts marking commencement of control characters, and second means coupled to said third and fourth contacts to prevent the recording of received control characters and to permit the recording of received message characters.

4. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to delay the operation of said second contacts, synchronized operation of said first and second contacts marking commencement of control characters, first reset means coupled to reset said first mechanical time delay means and said second contacts the cycling of the second contacts occurring within a time duration shorter than the time duration of a message character, first means coupled to said first and second contacts to stop the transmission of message characters for a predetermined interval greater than the normal interval of time occurring between message characters and less than the deviation of a single character after the occurrence of an interruption of transmission of characters, a recording means at said second station fed by said signal transmitting means, third contacts at said second station driven to a first state at the absence of a message character transmitted to said recording means, fourth contacts at said second station driven to a first state at the termination of a message character transmitted to said recording means, second mechanical time delay means coupled to delay the operation of said fourth contacts, synchronized operation of said third and fourth contacts marking commencement of control characters, second reset means coupled to reset said second mechanical time delay means and said fourth contacts the cycling of the fourth contacts occurring within a time duration shorter than the time duration of a message character, and second means coupled to said third and fourth contacts to selectively prevent the recording of received control characters and to permit the recording of received message characters.

5. A system for the transmission of control and message characters between a first station and a second station comprising a signal transmitting means at said first station, first means coupled to said signal transmitting means to stop the transmission of characters for a predetermined interval greated than the normal interval of time occuring between message characters and less than the duration of a single character at the commencement of control characters, a recording means at said second station fed by said signal transmitting means, second means coupled to said signal transmitting means and to said recording means activated by the predetermined interval stop in transmission of signals to prevent the recording of received control characters, reply means at said second station selectively sensitive to control characters from said signal transmitting means to generate an answer back signal, and third means at said first station coupled to receive the signal generated by said reply means.

6. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first delay means coupled to delay the operation of said second contacts, first means coupled to said first and second contacts to stop the transmission of characters for a predetermined interval greater than the normal interval of time occurring between message characters and less than the duration of a single character after the occurrence of an interruption of transmission of characters, a recording means at said second station fed by said signal transmitting means, third contacts at said second station driven to a first state at the absence of a message character, fourth contacts at said second station driven to a first state at the termination of a message character, second delay means coupled to delay the operation of said fourth contacts, synchronized operation of said third and fourth contacts marking commencement of control characters, second means coupled to said third and fourth contacts to prevent the recording of received control characters and to permit the recording of received message characters, relay means at said second station selectively sensitive to control characters from said signal transmitting means to generate an answer back signal, and third means at said first station coupled to receive the signal generated by said reply means.

7. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, synchronized operation of said first and second contacts marking commencement of control characters, first means coupled to said first and second contacts to stop the transmission of characters for a predetermined interval greater than the normal interval of time occurring between message characters and less than the duration of a single character after the occurrence of an interruption of transmission of characters, a recording means at said second station fed by said signal transmitting means, third contacts at said second station driven to a first state at the absence of a character transmitted to said recording means, fourth contacts at said second station driven to a first state at the termination of a character transmitted to said recording means, second mechanical time delay means coupled to retard the operation of said fourth contacts, synchronized operation of said third and fourth contacts marking commencement of control characters, second means coupled to said third and fourth contacts to prevent the recording of received control characters and to permit the recording of received message characters, reply means at said second station selectively sensitive to control characters from said signal transmitting means to generate an answer back signal, and third means at said first station coupled to receive the signal generated by said reply means.

8. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, synchronized operation of said first and second contacts marking commencement of control signals, first means coupled to said first and second contacts to stop the transmission of message characters for a predetermined interval after the occurrence of an interruption of transmission of message characters, a recording means at said second station fed by said signal transmitting means, third contacts at said second station driven to a first state at the absence of a transmitted character, fourth contacts at said second station driven to a first state at the termination of a transmitted character, second mechanical time delay means coupled to retard the operation of said fourth contacts, synchronized operation of said first and second contacts marking commencement of control means, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, and fourth means fed by said third means to drive said second station to an inactive state when the proper signal is not received within a particular interval of time.

9. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first delay means coupled to delay the operation of said second contacts, first means coupled to said first and second contacts to stop the transmission of characters for a predetermined interval greater than the normal interval of time occurring between message characters and less than the duration of a single character after the occurrence of an interruption of transmission of characters, a recording means at said second station fed by said signal transmitting means, third contacts at said second station driven to a first state at the absence of a message character, fourth contacts at said second station driven to a first state at the termination of a message character, second delay means coupled to delay the operation of said fourth contacts, second means coupled to said third and fourth contacts to prevent the recording of received control characters and to permit the recording of received message characters, clock means at said first station to indicate time, and third means at said first station to couple selectively said clock means to said signal transmitting means to feed the time of the message to the recording means.

10. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, first means coupled to said first and second contacts to stop the transmission of message characters for a predetermined interval greater than the normal interval of time occurring between message characters and shorter than the duration of a single character after the occurrence of an interruption of transmission of message characters, a recording means at said second station fed by said signal transmitting means, third contacts at said second station driven to a first state at the absence of a transmitted character, fourth contacts at said second station driven to a first state at the termination of a transmitted message character, second mechanical time delay means coupled to retard the operation of said fourth contacts, second means coupled to said third and fourth contacts to prevent the recording of received control characters and to permit the recording of received message characters, clock means at said first station to indicate time, and third means at said first station to couple selectively said clock means to said signal transmitting means to feed the time of the message to the recording means.

11. A system for the transmission of control and message characters between a first station and a second station comprising a signal transmitting means at said first station, first contacts driven to a first state by said signal transmitting means at the absence of a character, second contacts driven to a first state by said signal transmitting means at the termination of a message character, first delay means coupled to delay the operation of said second contacts, synchronized operation of said first and second contacts marking commencement of control characters, first means coupled to said first and second contacts to stop the transmission of message characters for a predetermined interval greater than the normal interval of time occurring between message characters and shorter than the duration of a single character after the occurrence of an interruption of transmission of message characters, a recording means at said second station fed by said signal transmitting means, third contacts at said second station driven to a first state at the absence of a message character, fourth contacts at said second station driven to a first state at the termination of a message character, second delay means coupled to delay the operation of said fourth contacts, synchronized operation of said third and fourth contacts marking commencement of control signals, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, clock means at said first station to indicate time, and fourth means at said first station to couple selectively said clock means to said signal transmitting means to feed the time of the message to the recording means.

12. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, synchronized operation of said first and second contacts marking commencement of control characters, first means coupled to said first and second contacts, to stop the transmission of message characters for a predetermined interval greater than the normal interval of time occurring between message characters and shorter than the duration of a single character after the occurrence of an interruption of transmission of message characters, a recording means at said second station fed by said signal transmitting means, third contact at said second station driven to a first state at the absence of a transmitted message character, fourth contacts at said second station driven to a first state at the termination of a transmitted message character, second mechanical time delay means coupled to retard the operation of said fourth contacts, synchronized operation of said third and fourth contacts marking commencement of control characters, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, clock means at said first station to indicate time, and fourth means at said first station to couple selectively said clock means to said signal transmitting means to feed the time of the message to the recording means.

13. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, synchronized operation of said first and second contacts marking commencement of control characters, first reset means coupled to reset said first mechanical time delay means and said second contacts, the cycling of the second contacts occurring within a time duration shorter than the time duration of a message character, first means coupled to said first and second contacts to stop the transmission of message characters for a predetermined interval greater than the normal interval of time occurring between message characters and shorter than the duration of a single character after the occurrence of an interruption of transmission of message characters, a recording means at said second station fed by said signal transmitting means, third contacts at said second station driven to a first state at the absence of a transmitted message character, fourth contacts at said second station driven to a first state at the termination of a transmitted message character, second mechanical time delay means coupled to retard the operation of said fourth contacts, synchronized operation of said third and fourth contacts marking commencement of control signals, second reset means coupled to reset said second mechanical time delay means and said fourth contacts the cycling of the fourth contacts occurring within a time duration shorter than the time duration of a message character, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, clock means at said first station to indicate time, and fourth means at said first station to couple selectively said clock means to said signal transmitting means to feed the time of the message to the recording means.

14. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first delay means coupled to retard the operation of said second contacts, synchronized operation of said first and second contacts marking commencement of control characters, first means coupled to said first and second contacts to stop the transmission of message characters for a predetermined interval greater than the normal interval of time occurring between message characters and shorter than the duration of a single character after the occurrence of an interruption of transmission of message characters, a recording means at said second station fed by said signal transmitting means, third contacts at said second station driven to a first state at the absence of a transmitted message character, fourth contacts at said second station driven to a first state at the termination of a transmitted message character, second delay means coupled to retard the operation of said fourth contacts, synchronized operation of said third and fourth contacts marking commencement of control characters, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, fourth means fed by said third means to drive said second station to an inactive state when the proper signal is not received within a particular interval of time, clock means at said first station to indicate time, and fifth means at said first station to couple selectively said clock means to said signal transmitting means to feed the time of the message to the recording means.

15. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, synchronized operation of said first and second contacts marking commencement of control characters, first means coupled to said first and second contacts to stop the transmission of message characters for a predetermined interval greater than the normal interval of time occurring between message characters and shorter than the duration of a single character after the occurrence of an interruption of transmission of message characters, a recording means at second station fed by said signal transmitting means, third contacts at said second station driven to a first state at the absence of a transmitted message character, fourth contacts at said second station driven to a first state at the termination of a transmitted message character, second mechanical time delay means coupled to retard the operation of said fourth contacts, synchronized operation of said third and fourth contacts marking commencement of control characters, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, fourth means fed by said third means to drive said second station to an inactive state when the proper signal is not received within a particular interval of time, clock means at said first station to indicate time, and fifth means at said first station to couple selectively said clock means to said signal transmitting means to feed the time of the message to the recording means.

16. A system for the transmission of control and message characters between a first station and a second station comprising a signal transmitting means at said first station, first contacts driven to a first state by said signal transmitting means at the absence of a message character, second contacts driven to a first state by said signal transmitting means at the termination of a message character, first mechanical time delay means coupled to retard the operation of said second contacts, synchronized operation of said first and second contacts marking commencement of control characters, first reset means coupled to reset said first mechanical time delay means and said second contacts, the cycling of the second contacts occurring within a time duration shorter than the time duration of a message character, first means coupled to said first and second contacts to stop the transmission of message characters for a predetermined interval greater than the normal interval of time occurring between message characters and shorter than the duration of a single character after the occurrence of an interruption of transmission of message characters, a recording means at said second station fed by said signal transmitting means, third contacts at said second station driven to a first state at the absence of a transmitted message characer, fourth contacts at said second station driven to a first state at the termination of a transmitted message character, second mechanical time delay means coupled to retard the operation of said fourth contacts, synchronized operation of said third and fourth contacts marking commencement of control characters, second reset means coupled to reset said second mechanical time delay means and said fourth contacts the cycling of the fourth contacts occurring within a time duration shorter than the time duration of a character, second means coupled to said third and fourth contacts to prevent the recording of received control characters and to permit the recording of received message characters, reply means at said second station selectively sensitive to control characters from said signal transmitting means to generate an answer back signal, third means at said first station coupled to receive the signal generated by said reply means, fourth means fed by said third means to drive said second station to an inactive state when the proper signal is not received within a particular interval of time, clock means at said first station to indicate time, and fifth means at said first station to couple selectively said clock means to said signal transmitting means to feed the time of the message to the recording means.

17. A system for the transmission of control and message characters between a terminal station and waystations comprising a first signal transmitting means at said terminal station, first contacts driven to a first state by said first signal transmitting means at the absence of a message character, second contacts driven to a first state by said first signal transmitting means at the termination of a message character, first mechanical time delay means coupled to retard the operation of said second contacts, synchronized operation of said first and second contacts marking commencement of control characters, first reset means coupled to reset said first mechanical time delay means and said second contacts, the cycling of the second contacts occurring within a time duration shorter than the time duration of a message character, first means coupled to said first and second contacts to stop the transmission of message characters for a predetermined interval greater than the normal interval of time occurring between message characters and shorter than the duration of a single character after the occurrence of an interruption of transmission of message characters, a first recording means at a first waystation, a second recording means at a second waystation said first and second recording means fed by said first signal transmitting means, third contacts at said first waystation driven to a first state at the absence of a transmitted message character, fourth contacts at said first waystation driven to a first state at the termination of a transmitted message characer, second mechanical time delay means coupled to retard the operation of said fourth contacts, synchronized operation of said third and fourth contacts marking commencement of control characters, second reset means coupled to reset said second mechanical time delay means and said fourth contacts the coupling of the fourth contacts occurring within a time duration shorter than the time duration of a character, second means coupled to said third and fourth contacts to selectively prevent the recording of received control characters and to permit the recording of received message characters, fifth contacts at a second waystation coupled to indicate the absence of a transmitted character, sixth contacts at said second waystation to indicate the termination of a transmitted character, third mechanical time delay means coupled to retard the operation of said sixth contacts, third reset means coupled to reset said third mechanical time delay means and said sixth contacts the cycling of the sixth contacts occurring within a time duration shorter than the time duration of a character, third means coupled to said fifth and sixth contacts to selectively prevent the recording of received control characters and to permit the recording of received message characters, second signal transmitting means at said first waystation, third signal transmitting means at said second waystation, first request means at said first waystation coupled to said second signal transmitting means to solicit permission to transmit message characters to the terminal station, second request means at said second waystation coupled to said third signal transmitting means to solicit permission to transmit message characters to the terminal station, invitation means at said terminal station coupled to said first request means and said second request means to enable sequentially said first and second waystations to transmit message characters, and third recording means at said terminal station to receive the message characters transmitted by said waystations.

References Cited in the file of this patent

UNITED STATES PATENTS

| | | |
|---|---|---|
| 2,088,750 | Kinkead | Aug. 3, 1937 |
| 2,357,297 | Wack et al. | Sept. 5, 1944 |
| 2,474,257 | Klienschmidt | June 28, 1949 |
| 2,584,997 | Ferguson | Feb. 12, 1952 |
| 2,979,556 | Aspach et al. | Apr. 11, 1961 |
| 3,022,372 | Votaw | Feb. 20, 1962 |